United States Patent

Nakashima

[11] Patent Number: 6,031,988
[45] Date of Patent: Feb. 29, 2000

[54] SIMULATION EQUIPMENT AND SIMULATION METHOD AND COMPUTER READABLE RECORDING MEDIUM

[75] Inventor: Yasuhiko Nakashima, Kawasaki, Japan

[73] Assignee: Fujitsu Limited, Kawasaki, Japan

[21] Appl. No.: 08/902,334

[22] Filed: Jul. 29, 1997

[30] Foreign Application Priority Data

Jul. 31, 1996 [JP] Japan ................................ 8-201958
Jul. 24, 1997 [JP] Japan ................................ 9-198283

[51] Int. Cl.[7] ........................................... G06F 9/455
[52] U.S. Cl. .............................. 395/500.47; 395/500.44
[58] Field of Search .................... 340/172.5; 364/200; 395/375, 500.44, 500.47, 70; G06F 9/318

[56] References Cited

U.S. PATENT DOCUMENTS 3,942,155  3/1976  Lawlor ................................ 340/172.5
4,638,426  1/1987  Chang et al. ......................... 364/200
4,794,522  12/1988  Simpson ............................... 364/200
5,408,622  4/1995  Fitch .................................... 395/375
5,751,982  5/1998  Morley ................................. 395/300

FOREIGN PATENT DOCUMENTS

WO 98/29802  7/1998  WIPO ............................. G06F 9/318

*Primary Examiner*—Kevin J. Teska
*Assistant Examiner*—Lonnie A. Knox
*Attorney, Agent, or Firm*—Staas & Halsey LLP

[57] ABSTRACT

An emulation apparatus and method in which software containing both instructions and data from a given computer of a given architecture is converted into software to be executed on another computer with a different type of architecture. This is accomplished by a target source software holding section holding the source code to be converted. Then a program data conversion processing section sequentially converts the software program from a starting address to an address in which a branch instruction is contained. The main software is held by a main software holding section. A conversion state registering section registers identification data showing if the program data to be converted is already converted for each corresponding address.

24 Claims, 17 Drawing Sheets

| PAGE NUMBER | CONVERTED SOFTWARE AREA | | |
|---|---|---|---|
| | LOCK DISPLAY | LEADING BLOCK ADDRESS | LAST BLOCK ADDRESS |
| | 0 0 0 0 | | |
| | F F F F | | |
| ≈ | ≈ | ≈ | ≈ |
| | | | |

LOCK DISPLAY 0000 : NONLOCK STATE
FFFF : LOCK STATE

- CONDITION CODE
- DATA LENGTH
- STEP DESIGNATOR
- 0001000 (BINARY NUMBER)

SIMULATION EQUIPMENT AND SIMULATION METHOD AND COMPUTER READABLE RECORDING MEDIUM

BACKGROUND OF THE INVENTION

1. Field of the Invention

The present invention relates to a simulation equipment and the like suitable for use in a data processing equipment executing a software that is operational in the other type of data processing equipment.

In recent years, the processing speed of the data processing equipment has been improved remarkably in a short time as the technology advances. It has frequently been seen that a data processing equipment admitted as the highest processing speed at a certain point in time has been surpassed in terms of the processing speed in a while by the other type of data processing equipment newly developed.

To the data processing equipment used by a large number of users can be allocated a sufficient cost for developing a hardware, so that high performance equipment will be developed one after another. On the other hand, to the data processing equipment used by a small number of users cannot necessarily be allocated such an ample cost, so that the hardware development for a high performance equipment will be difficult.

However, while the data processing equipment used by a small number of users remains unimproved in the performance, if a software that is operational in the data processing equipment can be made to operate in the data processing equipment used by a large number of users that has newly been developed, the users using the data processing equipment will always be able to obtain the necessary processing capacity.

The data processing equipment executes specific circuit operations by built-in softwares, however, generally the data processing equipments each contain different instruction data (instruction word or instruction word train) to execute the circuit operations; and therefore, the software composed of combinations of instruction data is not operational as it stands in the other type of the data processing equipments.

In other words, a program (machine language) that is operational in one data processing equipment cannot be used as it is in the other data processing equipments that have different architectures.

Especially when only a software in which instruction data are combined to directly operate the circuits which is called a load module, is present and a software described by a high-level language called as a source program is not present, it is very difficult to transplant the software into the other type of the data processing equipment.

In order to solve the foregoing problem, a simulation equipment as a data processing equipment is considered necessary which converts a conversion source software composed of instruction data to operate a certain type of data processing equipment into a converted software composed of instruction data to operate a different type of data processing equipment, and executes the converted software having been converted so as to perform the processing equivalent to the conversion source software.

2. Description of the Related Art

The related art will be described as to (a) construction of a conventional simulation equipment and (b) processing flow of a conventional simulation equipment, in this order.

In the description hereunder, the same parts or the corresponding parts will be given the same reference symbols.

(a) construction of a conventional simulation equipment

FIG. 16 is a block diagram showing a construction of a conventional simulation equipment.

A simulation equipment 100 shown in FIG. 16 is comprised of an input circuit 2, main memory circuit 3, and processor circuit 4. The simulation equipment 100 converts a processing instructed by a conversion source software inputted through the input circuit 2 into an instruction of a converted software that the self-equipment can execute and executes the processing.

Here, the input circuit 2 is connected to the main memory circuit 3, and inputs the conversion source software into the main memory circuit 3.

And, the main memory circuit 3 holds a conversion source software inputted through the input circuit 2, a software to convert this conversion source software into a converted software and to execute the converted software, and a software to execute an interrupt processing when an interruption occurs on the process of executing the software. The main memory circuit 3 is connected to the input circuit 2 and the processor circuit 4.

Concretely, the main memory circuit 3 is provided with an input processing program area 31, conversion source software area 32, conversion execution processing program area 34', and interruption processing program area 33.

Here, the input processing program area 31 is an area to hold a software (program) for transferring the conversion source software inputted through the input circuit 2 to the conversion source software area 32.

And, the conversion source software area 32 is an area to hold the conversion source software inputted through the input circuit 2.

Further, the conversion execution processing program area 34' is an area to hold a software that decodes conversion source instruction data in the conversion source software held in the conversion source software area 32 into converted instruction data word by word and operates the processor circuit 4 in accordance with the instruction of the converted instruction data.

And, the interruption processing program area 33 is an area to hold a software that, when an unplanned event occurs on a processing, interrupts the planned operation to process the event and thereafter makes the planned processing to be executed.

And, the softwares held in the input processing program area 31, conversion execution processing program area 34', and interruption processing program area 33 each are executed by the processor circuit 4, so that these areas are made to function as an input processing division, conversion execution processing division, and interruption processing division, respectively (reference symbols 131, 134, and 133, respectively, in FIG. 17).

Further, FIG. 17 shows a construction of a functional block in the conventional simulation equipment. In FIG. 17, a reference symbol 140 shows a simulation executing division that converts a processing instructed by the conversion source software inputted through the input circuit 2 into a processing instructed by a converted software to execute.

And, the processor circuit 4 is comprised of an instruction counter 5 and a general purpose register 6. The processor circuit 4 reads out the softwares (namely, the softwares held in the input processing program area 31, conversion execution processing program area 34', and interruption processing program area 33) and operates the simulation equipment 100 in accordance with the instructions of the softwares; and it is connected to the main memory circuit 3.

The instruction counter 5 is a circuit that holds an address in which the instruction data read out subsequently to the main memory circuit 3 is stored, in which the data length of the instruction data is added to update the data each time when the instruction data is read out from the main memory circuit 3.

The general purpose register 6 is a circuit to hold data necessary for various processings and control data, and to temporarily hold data designated by the software that become necessary in the course of the processings.

And, the general purpose register 6 is provided with a read-out address area 62 and a control data area 64.

The read-out address area 62 is an area to hold an address in which the instruction data read out subsequently to the conversion source software area 32 is stored, and to add the data length of the conversion source instruction data to update the data, each time when the conversion source instruction data is read out from the conversion source software area 32.

And, the control data area 64 is an area to hold a state code (condition code) generated from that a processing instructed by the conversion source instruction data is executed, and a beta length of the conversion source instruction data read out.

(b) processing flow of a conventional simulation equipment

The processing flow of the conventional simulation equipment 100 shown in FIG. 16 and FIG. 17 will be described with reference to FIG. 18.

In the simulation equipment 100, when a conversion source software is inputted into the main memory circuit 3 through the input circuit 2, first, the conversion source software is stored in the conversion source software area 32 in the main memory circuit 3 by the input processing division 131 (step B01).

And, the leading address of a conversion source instruction data stored in the conversion source software area 32 is set in the read-out address area 62 of the general purpose register 6 of the processor circuit 4 (step B02).

Next, the conversion source instruction data is read out from an area in the conversion source software area 32, instructed by a read-out address held in the read-out address area 62 (step B03), and the read out conversion source instruction data is decoded word by word by the conversion execution processing division 134 (step B04).

Step B05 judges whether or not the conversion source instruction data is an end instruction, and if it is the end instruction, the processing is ended ("end" from YES route of step B05); and if not, the processing is continued (step B06 from NO route of step B05).

If the decoded conversion source instruction data is not an end instruction, the data length of the conversion source instruction data is set in the control data area 64 of the general purpose register 6 of the processor circuit 4 by the conversion execution processing division 134, and the instruction data length is added on the read-out address to be stored in the read-out address area 62 (step B06).

Thereafter, the processings instructed by the conversion source instruction data is executed word by word by the conversion execution processing division 134 (step B07).

Further, the conversion execution processing division 134 checks the presence of an external interruption (if an external interruption is detected or not) (step B08), if the external interruption is not detected, the step returns to step B03. And, if the external interruption is detected, the interruption processing division 133 executes ain interruption processing with regard to the external interruption (step B09), and then the step returns to step B03.

And, until the end instruction is decoded, the operations of the foregoing step B03 through step B09 are sequentially repeated.

However, in the conventional simulation equipment 100, a conversion source instruction data is decoded word by word into a converted instruction data, the processing (simulation operation) instructed by the converted instruction data is executed for one word of the conversion source instruction data (in some cases, instruction data for plural words); and therefore, when the instruction data conversion operations as such are frequently repeated (namely, when the number of the conversion source instruction data in the conversion source software is very large), there exists a problem to require an enormous processing time for simulation operations.

SUMMARY OF THE INVENTION

The present invention has been made in view of the foregoing problem, and it is therefore an object of the present invention to provide a simulation equipment and a simulation method whereby the processing time required for simulation operations can significantly be reduced, and to provide a recording medium readable by a computer in which a simulation program for executing such simulation operations is recorded.

In order to accomplish the foregoing object, a simulation equipment relating to the invention comprises: a conversion source data holding means for holding the conversion source software; a conversion display means for displaying, when the conversion source software is converted into the converted software, a leading address of a storage destination for a converted instruction data converted from a conversion source instruction data on an address corresponding to a storage address of the conversion source instruction data constituting the conversion source software in the conversion source data holding means; a converted data holding means for holding the converted software composed of the converted instruction data converted from the conversion source instruction data; and a conversion processing means for branching, when referring to the address corresponding to the storage address of the conversion source instruction data in the conversion display means and finding that the leading address of the storage destination for the converted instruction data is displayed, the processing into a processing instructed by the converted instruction data.

Thus, according to the simulation equipment of the invention, it becomes unnecessary to convert the conversion source instruction data into the converted instruction data word by word and to execute the processing instructed by the converted instruction data; and therefore, it is possible to significantly reduce the processing time required for the simulation operations, which is advantageous.

Further, the simulation equipment of the invention is characterized by comprising: a program data conversion processing means for sequentially converting a program block from a leading address to an address with which a branch instruction begins, of a conversion source program data constituting a conversion source software, into a program data constituting a converted software, executing said converted software, and thus executing a processing equivalent to the conversion source software; a converted software holding means for holding the converted software converted by the program data conversion processing means; a conversion state registering division for registering an identification data showing whether or not the program data to be converted by the program data conversion processing means is already converted into the converted program data, for each of corresponding addresses; and the program data conversion processing means further comprising: a judgment division for judging, when the program data conversion processing means executes said converted software before executing the branch instruction, whether or not the converted program data corresponding to a branch destination program data is held in the converted software holding means by referring to the conversion state registering division; a branch execution division for executing, when the converted program data corresponding to the branch destination program data in the branch instruction is judged to be held in the converted software holding means, the branch instruction on the basis of the converted program data held in the converted software holding means; and a branch destination conversion division for converting, when the converted program data corresponding to the branch destination program data in the branch instruction data is judged not to be held in the converted software holding means, the conversion source program data into the converted program data while serving the branch destination address as the leading address.

Thus, according to the simulation equipment of the intention, it becomes unnecessary to convert the conversion source program data into the converted program data word by word and to execute the processing instructed by the converted program data; and therefore, it is possible to significantly reduce the processing time required for the simulation operations, which is advantageous.

Further, the simulation method of the invention for executing a simulation operation such that a first software running on a computer of a first architecture is operated on a computer of a second architecture different from the first architecture is characterized by comprising the following steps: a conversion step for sequentially converting a program block from a leading address to an address with which a branch instruction begins, of a program data in the first software, into a second software that can run on the computer of the second architecture; a second software holding step for holding a program data constituting the second software converted by the conversion step; a conversion state registering step for registering whether or not a program data to be converted by the conversion step is already converted into a program data constituting the second software for each of the corresponding addresses; an execution step for executing the second software converted by the conversion step; a judgment step for judging, when the execution step executes the second software before executing the branch instruction, whether or not a branch destination program data is converted into the program data constituting the second software, by referring to a registered result in the conversion state registering step; a branch execution step for executing, when the branch destination program data is judged to be converted into the program data constituting the second software in the judgment step, the branch instruction on the basis of the converted program data held in the second software holding step; and a branch destination conversion execution step for executing, when the branch destination program data is judged not to be converted into the program data constituting the second software in the judgment step, after the conversion step converts the program data of the first software into the program data of the second software, the branch instruction by serving the branch destination address as the leading address.

Further, the simulation method of the invention for executing a simulation operation such that a first software running on a computer of a first architecture is operated on a computer of a second architecture different from the first architecture is characterized by comprising the following steps: a conversion step for converting a program data of the first software into a program data of the second software that can run on the computer of the second architecture; a second software holding step for holding a program data constituting the second software converted in the conversion step; a conversion state registering step for registering whether or not a program data to be converted in the conversion step is already converted into the program data constituting the second software; a judgment step for judging, by referring to a registered result in the conversion state registering step, whether or not the program data of the first software to be converted is already converted into the program data constituting the second software; and an execution step for executing, when the program data of the first software is judged to be already converted into the program data constituting the second software in the judgment step, the program data constituting the second software held in the second software holding step, and when the program data of the first software is judged not to be converted into the program data constituting the second software in the judgment step, after the conversion step converts the program data of the first software into the program data of the second software, the program data constituting the second software.

Thus, according to the simulation method of the invention, it becomes unnecessary to convert the program data constituting the first software into the converted program data constituting the second software word by word and to execute the processing instructed by the converted program data; and therefore, it is possible to significantly reduce the processing time required for the simulation operations, which is advantageous.

Further, the computer readable recording medium of the invention is a recording medium in which a simulation program for executing a first software running on a computer of a first architecture on a computer of a second architecture different from the first architecture is recorded, and the computer readable recording medium is characterized in that the simulation program is recorded for achieving the following functions: a conversion function for sequentially converting a program block from a leading address to an address with which a branch instruction begins, of a program data in the first software, into a second software that can run on the computer of the second architecture; a second software holding function for holding a program data constituting the second software converted by the conversion function; a conversion state registering function for registering whether or not the program data to be converted by the conversion function is already converted into a program data constituting the second software for each of the corresponding addresses; an execution function for executing the second software converted by the conversion function; a judgment function for judging, when the execution function executes the second software before executing the branch instruction, whether or not the branch destination program data is converted into the program data constituting the second software, by referring to the registered result in the conversion state registering function; a branch execution function for executing, when the branch destination program data is judged to be converted into the program data constituting the second software by the judgment function, the branch instruction on the basis of the converted program data held by the second software holding function; and a branch destination conversion function for executing, when the branch destination program data is judged not to be converted into the program data constituting the second software by the judgment function, after the conversion function converts the program data of the first software into the program data of the second software, the branch instruction by serving the branch destination address as the leading address.

Further, the computer readable recording medium of the invention is a recording medium in which a simulation program for executing a first software running on a computer of a first architecture on a computer of a second architecture different from the first architecture is recorded, and the computer readable recording medium is characterized in that a simulation program is recorded for achieving the following functions: a conversion function for converting a program data of the first software into a program data of the second software that can run on the computer of the second architecture; a second software holding function for holding a program data constituting the second software converted by the conversion function; a conversion state registering function for registering whether or not a program data to be converted by the conversion function is already converted into the program data constituting the second software; a judgment function for judging, by referring to a registered result by the conversion state registering function, whether or not the program data of the first software to be converted is already converted into the program data constituting the second software; and an execution function for executing, when the program data of the first software is judged to be already converted into the program data constituting the second software by the judgment function, the program data constituting the second software held by the second software holding function, and when the program data of the first software is judged not to be converted into the program data constituting the second software by the judgment function, after the conversion function converts the program data of the first software into the program data of the second software, the program data constituting the second software.

Thus, the computer readable recording medium of the invention has the same advantage as mentioned above.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT (I) Description of the Aspect of the Invention First, the aspect of the invention will be described with reference to the drawings.

Figure 1:
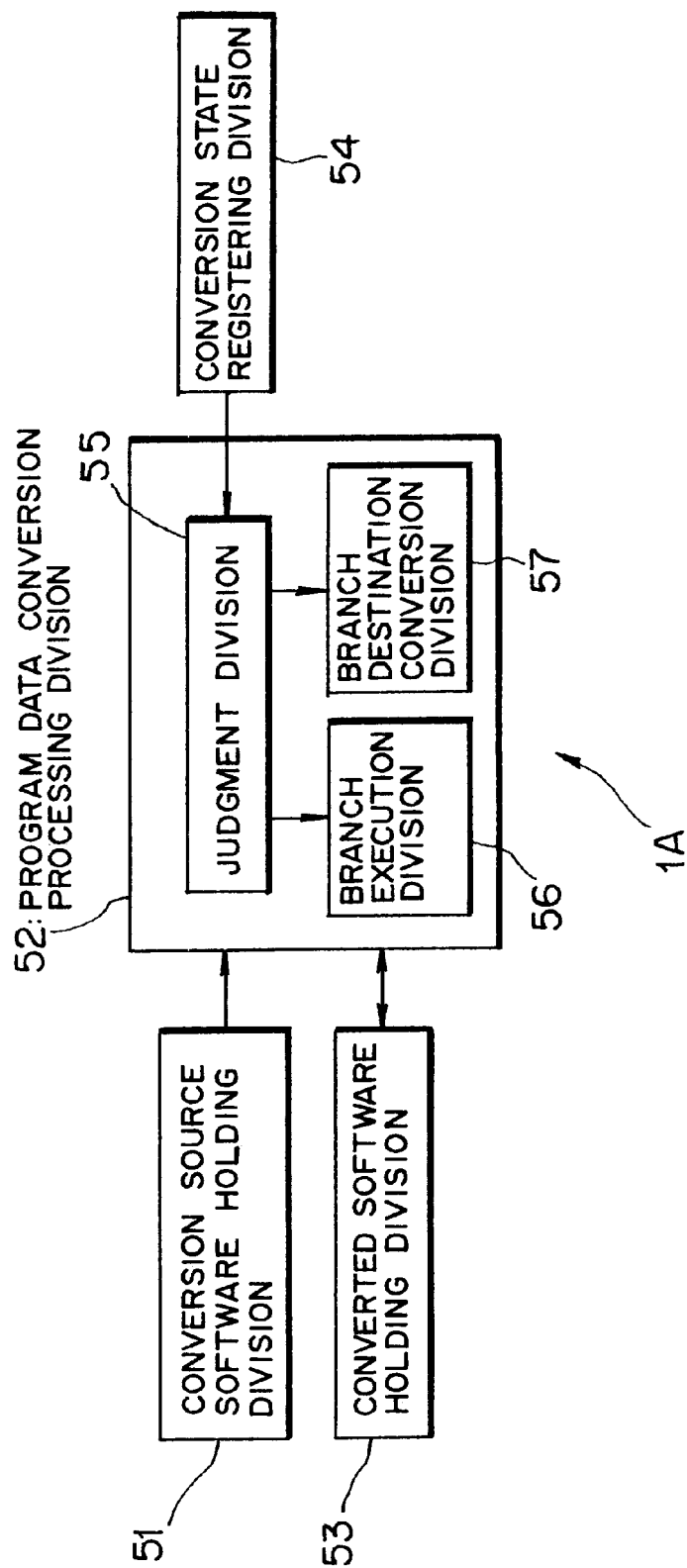
FIG. 1 is a block diagram showing the aspect of the invention.

FIG. 1 is a block diagram showing the aspect of a simulation equipment of the invention. A simulation equipment 1A shown in FIG. 1 is comprised of a conversion source software holding division 51, program data conversion processing division 52, converted software holding division 53, and conversion state registering division 54.

Here, the conversion source software holding division 51 holds a conversion source software.

And, the program data conversion processing division 52 sequentially converts a program block from an address which is instructed as a leading address to an address with which a branch instruction begins, of a conversion source program data constituting a conversion source software held in the conversion source software holding division 51, into a program data constituting a converted software and executes the converted software thus converted; and thus performing an equivalent processing to the foregoing conversion source software.

Here, the program data conversion processing division 52 is provided with a judgment division 55, branch execution division 56, and branch destination conversion division 57.

When executing the converted software converted as above, before executing the foregoing branch instruction, the judgment division 55 judges whether on not the converted program data corresponding to the branch destination program data is held in the converted software holding division 53 by referring to the conversion state registering division 54.

And, when the judgment division 55 judges that the converted program data corresponding to the program data of the branch destination in the foregoing branch instruction is held in the converted software holding division 53, the branch execution division 56 executes the foregoing branch instruction on the basis of the converted program data held in the converted software holding division 53.

Further, when the judgment division 55 judges that the converted program data corresponding to the program data of the branch destination in the foregoing branch instruction is not held in the converted software holding division 53, the branch destination conversion division 57 converts the foregoing conversion source program data into the converted program data by using the Foregoing branch destination address as the foregoing leading address.

Incidentally, the converted software holding division 53 is to hold the foregoing converted software converted by the program data conversion processing division 52.

Further, the conversion state registering division 54 is to register identification data showing whether or not the program data to be converted in the program data conversion processing division 52 is already converted as the converted program data, for each of corresponding addresses.

By the foregoing configuration, a simulation operation is executed in the simulation equipment 1A of the invention, in which a first software (conversion source software) running on a computer of a first architecture is operated on a computer of a second architecture different from the first architecture.

Figure 2:
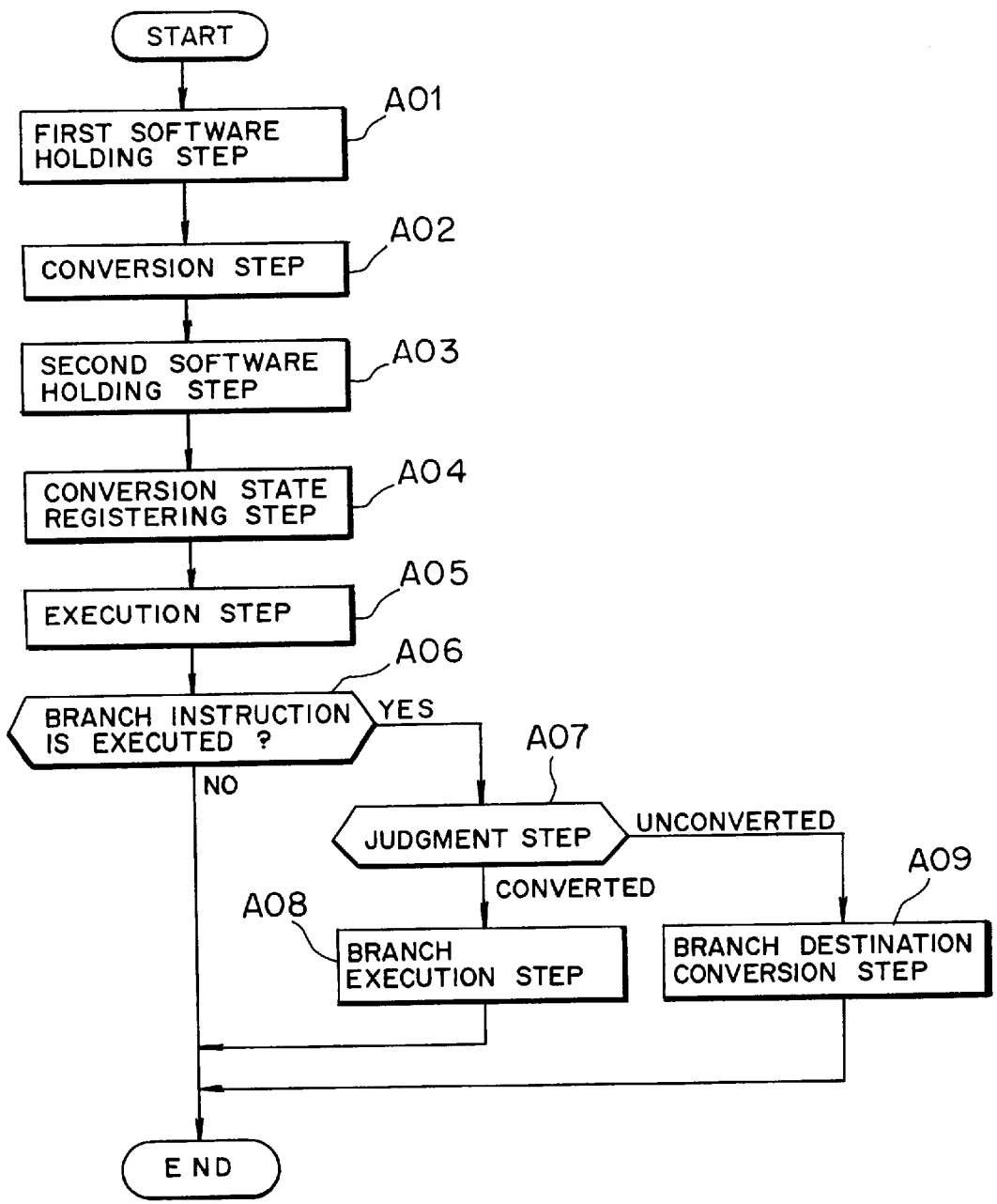
FIG. 2 is a flow chart for explaining the aspect of the invention.

The operation of the simulation equipment 1A will further be described with reference to a flow chart shown in FIG. 2.

First, a data of the first software is held in the conversion source software holding division 51 (first software hold step A 01).

Next, the program data conversion processing division 52 sequentially converts a program block from a leading address to an address with which a branch instruction begins, of a program data (program data constituting the conversion source software) in the first software, into a second software (converted software) that can run on the computer of the second architecture (conversion step A02).

Further, a program data constituting the second software converted in the conversion step A02 (namely, converted program data constituting the converted software) is held in the converted software holding division 53 (second software hold step A03).

Here, in the conversion state registering division 54, whether or not the program data to be converted in the conversion step A02 is already converted into program data constituting the second software is registered for each of the corresponding addresses (conversion state registering step A04).

And, the second software converted in the conversion step A02 is executed by the program data conversion processing division 52 (execution step A05).

When executing the second software in the execution step A05, before executing the foregoing branch instruction (YES route of step A06), the judgment division 55 judges whether or not tile branch destination program data is converted into the program data constituting the second software by referring to the registered result in the conversion state registering step A04 (judgment step A07).

And, when the judgment step A07 judges that the program data of the branch destination is converted into the program data constituting the second software ("converted" route of the judgment step A07), the branch execution division 56 executes the foregoing branch instruction on the basis of the converted program data held in the second software hold step A03 (branch execution step A08).

Further, when the judgment step A07 judges that the program data of the branch destination is not converted into the program data constituting the second software ("unconverted" route of the judgment step A07), after the branch destination conversion division 57 converts the program data of the foregoing first software into the program data of the second software serving the foregoing branch destination address as the foregoing leading address, the program data conversion processing division 52 executes the foregoing branch instruction (branch destination conversion executing step A09).

Further, the simulation method of the invention in the simulation equipment 1A comprises the following steps: a conversion step for converting a program data of the first software into a program data of the second software that can run on the computer of the second architecture; a second software holding step for holding a program data constituting the second software converted in the conversion step; a conversion state registering step for registering whether or not a program data to be converted in the conversion step is already converted into the program data constituting the second software; a judgment step for judging, by referring to a registered result in the conversion state registering step, whether or not the program data of the first software to be converted is already converted into the program data constituting the second software; and an execution step for executing, when the program data of the first software is judged to be already converted into the program data constituting the second software in the judgment step, the program data constituting the second software held in the second software holding step, and when the program data of the first software is judged not to be converted into the program data constituting the second software in the judgment step, after the conversion step converts the program data of the first software into the program data of the second software, the program data constituting the second software.

In the invention, the functions equivalent to the foregoing first software hold step A 01, conversion step A02, second software hold step A03, conversion state registering step A04, execution step A05, judgment step A07, branch execution step A08, and branch destination conversion execution step A09 are achieved by the operations of the processor circuit, in which a simulation program recorded on a recording medium (not illustrated) for a disk drive or the like in the computer of the second architecture is read out on a memory (RAM) and the simulation program is started to be executed by the processor circuit.

Here, the simulation program executes a simulation that the first software running on the computer of the first architecture is operated on the computer of the second architecture different from the foregoing first architecture.

Concretely, the simulation program is to make a computer achieve the following: a first software holding function to hold the data of the first software (the first software hold step A 01 is equivalent to this function); a conversion function to sequentially convert a program block from a leading address to an address with which a branch instruction begins, of a program data in the first software, into a second software that can run on the computer of the second architecture (the conversion step A02 is equivalent to this function); a second software holding function to hold the program data constituting the foregoing second software converted by the conversion function (the second software hold step A03 is equivalent to this function); a conversion state registering function to register whether or not the program data to be converted by the conversion function is already converted into program data constituting the second software for each of the corresponding addresses (the conversion state registering step A04 is equivalent to this function); an execution function to execute the second software converted by the conversion function (the execution step A05 is equivalent to this function); a judgment function to judge, when executing the foregoing second software in the execution function, before executing the foregoing branch instruction, whether or not the branch destination program data is converted into the program data constituting the second software by referring to the registered result in the conversion state registering function (the judgment step A07 is equivalent to this function); a branch execution function to execute, when the program data of the branch destination is judged to be converted into the program data constituting the second software in the judgment function, the foregoing branch instruction on the basis of the converted program data held in the second software holding function (the branch execution step A08 is equivalent to this function); and a branch destination conversion function to execute, when the program data of the branch destination is judged not to be converted into the program data constituting the second software, after converting the program data of the foregoing first software into the program data of the second software by serving the foregoing branch destination address as the foregoing leading address, the foregoing branch instruction (the branch destination conversion step A09 is equivalent to this function).

Namely, the simulation program is to make a computer achieve the followings: a conversion function for converting a program data of the first software into a program data of the second software that can run on the computer of the second architecture; a second software holding function for holding a program data constituting the second software converted by the conversion function; a conversion state registering function for registering whether or not a program data to be converted by the conversion function is already converted into the program data constituting the second software; a judgment function for judging, by referring to a registered result by the conversion state registering function, whether or not the program data of the first software to be converted is already converted into the program data constituting the second software; and an execution function for executing, when the program data of the first software is judged to be already converted into the program data constituting the second software by the judgment function, the program data constituting the second software held by the second software holding function, and when the program data of the first software is judged not to be converted into the program data constituting the second software by the judgment function, after the conversion function converts the program data of the first software into the program data of the second software, the program data constituting the second software.

Therefore, according to the simulation equipment and simulation method of the invention, of a conversion source program data constituting a conversion source software (program data constituting the first software), a program block from a leading address to an address with which a branch instruction begins is sequentially converted into program data constituting a converted software (program data constituting the second software), and thereby, it becomes unnecessary to convert the conversion source program data into the converted program data word by word and to execute the processing instructed by the converted program data; and therefore, it is possible to significantly reduce the processing time required for the simulation operations, which is advantageous.

Further, using the computer readable recording medium of the invention makes a computer realize a conversion function that sequentially converts a program block from a leading address to an address with which a branch instruction begins, of a program data in the first software, into a second software that can run on the computer of the second architecture, thereby achieving the same advantage as the foregoing.

Further, the aspect of the invention will be described with reference to FIG. 3.

The same parts or the equivalent parts that have been described in the foregoing will be given the same reference symbols, and new parts described in this section will be given new reference symbols.

Figure 3:
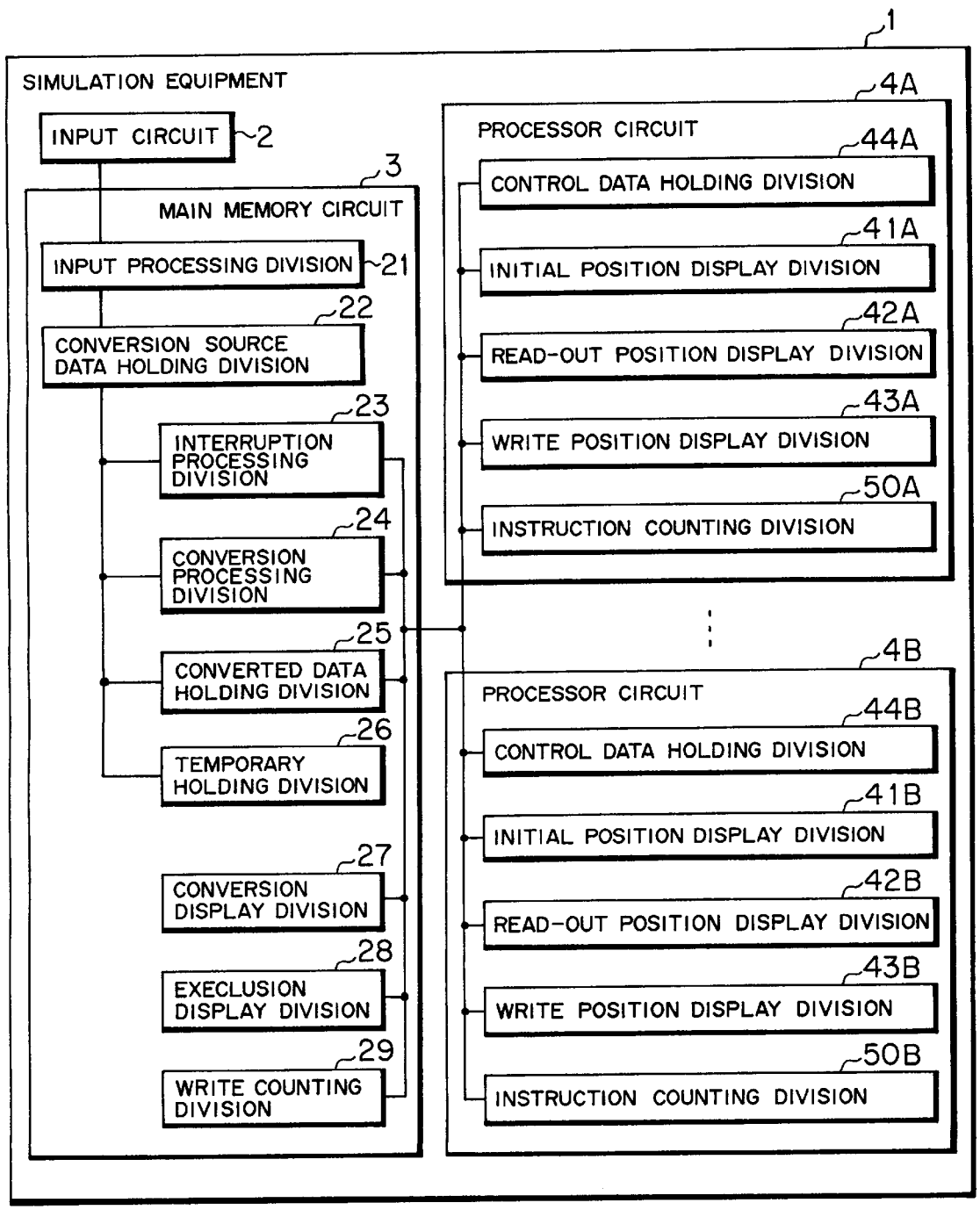
FIG. 3 is a block diagram showing the aspect of the invention.

In FIG. 3, 1 shows a simulation equipment, 2 input circuit, 3 a main memory circuit, 4A and 4B processor circuits, 21 input processing division, 22 conversion source data holding division, 23 interruption processing division, 24 conversion processing division, 25 converted data holding division, 26 temporary hold division, 27 conversion display division, 28 exclusion display division, 29 write counting division, 41A and 41B initial position display division, 42A and 42B read-out position display division, 43A and 43B write position display division, 44A and 44B control data holding division, and 50A and 50B instruction counting division.

In the description hereunder, as to the components having the same functions, the suffixes of the reference symbols will be omitted, for example, as "processor circuit 4" instead of processor circuits 4A and 4B.

A simulation equipment 1 is comprised of an input circuit 2, main memory circuit 3, and a plurality of processor circuits (in this description, two of processor circuit 4A and 4B); and converts a processing instructed by a conversion source software inputted through the input circuit 2 into an instruction of a converted software to execute.

The input processing division 21 transfers the conversion source software inputted through the input circuit 2 to the conversion source data holding division 22.

The conversion source data holding division 22 holds the conversion source software transferred by the input processing division 21, inputted through the input circuit 2.

The interruption processing division 23, when an unplanned event occurs on the process that the conversion source software is converted into the converted software and the converted software is executed, interrupts the planned operation to process the event, and thereafter returns the processing to the planned processing procedure.

The conversion processing division 24, when the conversion display division 27 displays the conversion source instruction data intended for the processing has been already converted, branches the processing so as to execute the processing instructed by the converted instruction data from the leading address in the converted data holding division corresponding to the said conversion source instruction data; when the conversion display division 27 displays being unconverted, converts the conversion source instruction data read out from the conversion source ata holding division 22 into the converted instruction data and stores the converted instruction data in the converted data holding division 25; and in the course of conversion, when the conversion source instruction data for one page is converted into the converted instruction data, when a processing procedure is found to be changed unconditionally, when an unplanned event is generated, the conversion processing division 24 ends the conversion processing and branches the processing is so as to execute the processing instructed by the converted instruction data.

The converted data holding division 25 holds the converted instruction data converted and generated from the conversion source instruction data by the conversion processing division 24.

The temporary hold division 26, when the conversion source instruction data is an indirect instruction that instructs an address where the conversion source instruction data to instruct a practical processing is stored by an operand, temporarily holds the converted instruction data converted and generated from the conversion source instruction data that instructs the practical processing.

The conversion display division 27 has the same number of entries as the conversion source data holding division 22, and displays being unconverted at the initial condition. When the conversion source instruction data is converted into the converted instruction data, the conversion display division 27 displays the leading address of the converted instruction data in which the conversion source instruction data is converted and generated in the entry corresponding to the leading address where the conversion source instruction data is held. When the conversion source instruction data monopolizes a plurality of entries, the conversion display division 27 displays an entry number on an entry next to the entry in which the leading address of the converted instruction data converted and generated from the conversion source instruction data is displayed.

The exclusion display division 28 displays whether each of the pages constituting the conversion source data holding division 22 is exclusively occupied or not by means of the lock display. And, the exclusion display division 28 holds the address of the leading block and the last block of a plurality of blocks constituting the converted data holding division 25 that holds the converted instruction data converted and generated from the conversion source instruction data held in the pages.

The write counting division 29, when a writing into the write protection area is instructed in the course that a processing instructed by the converted instruction data is executed, counts the number of the writing.

The initial position display division 41 instructs the leading address of the conversion source instruction data converted in the conversion source data holding division 22, and instructs the leading address of the conversion source instruction data corresponding to the converted instruction data processed in the course that a processing instructed by the converted instruction data is executed.

The read-out position display division 42 instructs the address in which the conversion source instruction data read out subsequently to the conversion source data holding division 22 is held.

The write position display division 43 instructs the address in which the converted instruction data read out subsequently to the converted data holding division 25 is held.

The control data holding division 44 holds the data length of the conversion source instruction data, the condition code gained by a result that a processing instructed by the conversion source instruction data is executed, and a binary constant '0001000'.

The instruction counting division 50 instructs the addresses in which the instruction data read out from the input processing division 21, interruption processing division 23, conversion processing division 24, and converted data holding division 25 are held. And, when an instruction data is read out, the instruction counting division 50 adds the data length of the foregoing instruction data to update the instruction data.

Next, the processing flow of the simulation will be described in the order of: (1) read-out of the conversion source software, (2) conversion of the conversion source instruction data into the converted instruction data, and (3) processing of the converted instruction data for each of the conversion source instruction data.

(1) read-out of the conversion source software

First, the conversion source software is set in the conversion source data holding division 22 from the input processing division 21 through the input circuit 2, and the leading address of the conversion source instruction data is set in the initial position display division 41.

Next, the leading address of the conversion source instruction data set in the initial position display division 41 is set in the read-out position display division 42 as a read-out address by the conversion processing division 24.

Next, an area corresponding to a read-out address in the conversion display division 27 is referred to by the conversion processing division 24, and if the read-out address violates the word boundary, the leading address for the interruption processing division 23 executing the interrupt processing of the word boundary violation is set in the initial position display division 41, and the process returns to the first processing in the processing procedure of the conversion processing division 24. If the read-out address does not violate the word boundary and the area corresponding to the read-out address displays being unconverted, (2) conversion of the conversion source instruction data stored in the conversion source data holding division 22 onto the converted instruction data is started. If the read-out address does not violate the word boundary and the area corresponding to the read-out address displays being already converted, (3) processing of the converted instruction data for each of the converted instruction data is executed corresponding to the conversion source instruction data, the leading of which is instructed by the initial position display division 41.

(2) conversion of the conversion source instruction data into the converted instruction data.

The conversion of the conversion source instruction data into the converted instruction data starts with checking whether the page instructed by the read-out address in the conversion source data holding division 22 is locked or not.

The lock display of the page instructed by the read-out address in the exclusion display division 28 is referred to by the conversion processing division 24, and if the page is displayed to be in a lock state, the processing is waited until the lock is released; when the lock is released, the lock display corresponding to the page in the exclusion display division 28 is given a lock.

Next, the exclusion display division 28 is referred to by the conversion processing division 24, and whether or not the residual capacity of the last block corresponding to the page is sufficient for storing the converted instruction data converted and generated from the conversion source instruction data instructed by the read-out address is checked.

If the residual capacity is insufficient for storing the converted instruction data, the block number of the converted data holding division 25 constituting the page is calculated. If the block number does not exceed the specified value, a new block is added to be associated with the last block, which replaces the last block of the exclusion display division 28. If the residual capacity is insufficient for storing the converted instruction data and the block number of the converted data holding division 25 constituting the page exceeds the specified value, the association with the block constituting the page is once released (namely, the subsequent block address is initialized), further, the area corresponding to the page in the conversion display division 27 is initialized, and thereafter, the new block is associated with the page to be registered in the exclusion display division 28.

Next, the conversion source instruction data is converted by the conversion processing division 24, which generates the converted instruction data to be stored in the subsequent area to the stored data in the converted data holding division 25.

When the conversion source instruction data is read out from the conversion source data holding division 22 instructed by the read-out address, the data length of the conversion source instruction data is set in the control data holding division 44.

Next, the conversion source instruction data is checked to be classified into the following categories.

(A) In case of the atomic instruction, as interruptions between processings will not be received as the COMPARE AND SWAP statement and instructions to instruct a plurality of simple processings such as the COMPARE statement and the SWAP statement are combined.

Subsequently to the converted instruction data already stored in the converted data holding division 25, an instruction to wait until a lock is released, instruction to instruct a lock, instruction train to instruct a plurality of simple processings, and instruction to instruct the release of a lock are stored by the conversion processing division 24.

(B) In case of instructions, such as EXECUTE statement, as an address in which an instruction data to instruct an actual processing is stored is specified by the operand.

Subsequently to the converted instruction data already stored (the final storage) in the converted data holding division 25, an instruction to read out the conversion source instruction data from an area designated by the operand of the conversion source instruction data, instruction to store the converted instruction data converted from the conversion source instruction data in the temporary hold division 26, instruction to instruct a branch into the leading address of the conversion processing division 24 (This means returning to the first processing in the processing procedure of the conversion processing division 24, namely converting the next conversion source instruction data.), and instruction to instruct a branch into the leading address of the converted instruction data are stored by the conversion processing division 24.

(C) In case of conditional branch instructions.

Subsequently to the converted instruction data already stored (the final storage) in the converted data holding division 25, an instruction to shift the binary constant '0001000' held in the control data holding division 44 right by a value specified by the condition code, and instruction data to instruct a branch when a comparison of a result of sifting the binary constant '0001000' right by a value specified by the condition code with a condition mask shows coincidence and to instruct a nonbranch when the comparison does not show coincidence are stored by the conversion processing division 24.

(D) In the other cases than (A) through (C).

The converted instruction data converted and generated from the conversion source instruction data is stored subsequently to the converted instruction data already stored (the final storage) in the converted data holding division 25 by the conversion processing division 24.

Next, when checking the presence of an external interruption and detecting the interruption, the instruction data to instruct a branch into the leading address of the conversion processing division 24 is stored subsequently to the converted instruction data already stored in the converted data holding division 25 by the conversion processing division 24.

Next, the writing addresses stored in the write position display division 43 are stored in the areas corresponding to the read-out addresses in the conversion display division 27, in the subsequent areas are stored entry numbers in accordance with the word length of the conversion source instruction data in the ascending order from the entry number 1, and the writing addresses are updated for the word length of the converted instruction data to be stored in the write position display division 43.

Next, when the converted conversion source instruction data is other than the unconditional branch instruction, the read-out addresses held in the read-out position display division 42 are updated; when the read-out address before updating and the read-out address after updating belong to the same page, the area specified by the read-out address after updating in the conversion display division 27 is further referred to; when the foregoing area displays not being used, the step designator in the control data holding division 44 is further referred to.

When the step designator is not found, the presence of an external interruption is checked; when the external interruption is not detected, the read-out addresses indicated in the read-out position display division 42 are stored in the initial position display division 41; the process returns to (1) read-out of the conversion source software, and the addresses set in the initial position display division 41 are set in the read-out position display division 42 as the read-out addresses by the conversion processing division 24, thus repeating the process.

When the converted conversion source instruction data is the unconditional branch instruction, when the read-out address before updating and the read-out address after updating belong to different pages, when the area specified by the read-out address after updating displays being used, when the step designator designates a step, or when an external interruption is detected, the instruction data to instruct a branch into the leading address of the conversion processing division 24 is stored subsequently to the converted instruction data already stored (the final storage) in the converted data holding division 25 by the conversion processing division 24, and the lock display for the page in the exclusion display division 28 specified by the initial position display division 41 is released to execute the processing of the converted instruction data.

(3) processing of the converted instruction data based on each of the conversion source instruction data.

The processing of the converted instruction data based on each of the conversion source instruction data executes a series of the converted instruction data constituting one word of the conversion source instruction data; when the conversion display division 27 gives a display being unconverted to an area in which the write protect interruption is detected and to which the write protect is instructed, the processing result is stored in an area in the converted data holding division 25 corresponding to the foregoing area; when the conversion display division 27 gives a display being already converted to the area, an area in the conversion display division 27 corresponding to the foregoing area is initialized (to put it in an unconverted state), and further in an area in the converted data holding division 25 corresponding to the foregoing area, the converted instruction data to designate a branch into the processing procedure in the conversion processing division 24 is stored; when an external interruption is not detected and the writing address does not indicate the leading address of the conversion processing division 24, (3) execution of the converted software is repeated from the beginning; when an external interruption is not detected and the writing address indicates the leading address of the conversion processing division 24, or when an external interruption is detected, the leading address of the external interruption procedure of the interruption processing division 23 is set in the initial position display division 41, and the process returns to and repeats the processing (1) read-out of the conversion source software, namely, the processing in which the address set in the initial position display division 41 is set in the read-out position display division 42 as a read-out address by the conversion processing division 24.

Accordingly, according to the simulation equipment of the invention, it becomes unnecessary to convert the conversion source instruction data into the converted instruction data word by word and to execute the processing instructed by the converted instruction data; and therefore, it is possible to significantly reduce the processing time required for the simulation operations, which is advantageous.

(II) Description of one embodiment of the intention

The embodiment of the invention will hereafter be described in the order of (a) configuration cf the simulation equipment relating to the embodiment of the invention, (b) processing flow of the simulation equipment relating to the embodiment, with reference to FIG. 4 through FIG. 15.

The identical or equivalent parts to those described in the conventional example and the aspect of the invention will be given the identical symbols, and the new parts appearing in this embodiment will be given the new reference symbols.

(a) configuration of the simulation equipment relating to the embodiment of the invention.

Figure 4:
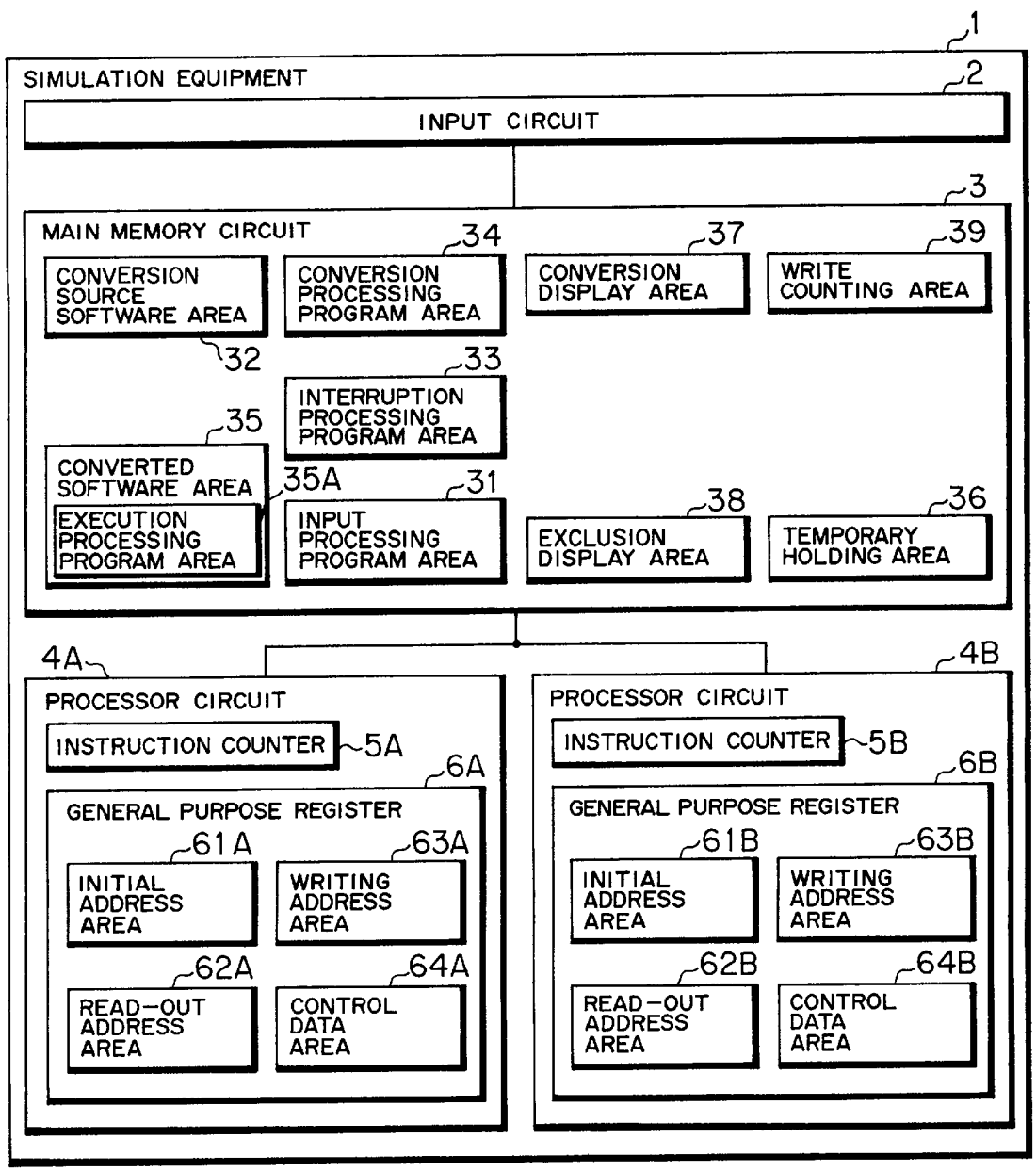
FIG. 4 is a block diagram showing a configuration of a simulation equipment relating to one embodiment of the invention.

FIG. 4 is a block diagram showing a configuration of a simulation equipment relating to one embodiment of the invention.

A simulation equipment 1 shown in FIG. 4 is comprised of an input circuit 2, main memory circuit 3, and a plurality of processor circuits 4A, 4B; and converts a processing instructed by a conversion source software (first software) operational on a computer of a architecture (hardware construction) inputted through the input circuit 2 into an instruction of a converted software which can be executed on a computer of a second architecture (second software) to execute.

In other words, the processor circuits 4A, 4B executes various programs stored in the main memory circuit 3, and thereby converts the conversion source software inputted through the input circuit 2 into the converted software to execute.

In the description hereunder, as to the components having the same functions, the suffixes of the reference symbols will be omitted, for example, as "processor circuit 4" instead of processor circuits 4A and 4B.

Here, the input circuit 2 is connected to the main memory circuit 3, and inputs the conversion source software into the main memory circuit 3, which is the same as the conventional as described above.

And, the main memory circuit 3 holds the conversion source software inputted through the input circuit 2, a software to convert this conversion source software into the converted software and to execute the converted software, and a software to execute an interrupt processing when an interruption occurs on the process of executing the software. Further, the main memory circuit 3 holds data to display a conversion state of the conversion source software into the converted software, the data of correspondence between the area in which the conversion source software is held and the area in which the converted software converted and generated from the conversion source software is held, and data to display an exclusively monopolized state of holding the conversion source software; and is connected to the input circuit 2 and processor circuits 4A, 4B.

Concretely, the main memory circuit 3 is provided with an input processing program area 31, conversion source software area 32, conversion processing program area 34, converted software area 35, interruption processing program area 33, temporary hold area 36, conversion display area 37, exclusion display area 38, and write counting area 39.

Here, the input processing program area 31 is an area to hold a software (program) for transferring the conversion source software inputted through the input circuit 2 to the conversion source software area 32, which is the same as the conventional as described above.

And, the conversion source software area 32 is an area to hold the conversion source software inputted through the input circuit 2, which functions as the conversion source software holding division. Further, the conversion source software area 32 is an area provided by separating the main memory circuit 3 into pages.

Further, the conversion processing program area 34 is an area for holding a software: by referring to an area corresponding to an address specified by a read-out address in the conversion display area 37 described later, to judge whether or not the conversion source instruction data (conversion source program data or program data constituting the first software) held in an area specified by a read out address in the conversion source software area 32 is converted into the converted instruction data (converted program data or program data constituting the second software), to start a processing specified by the converted instruction data when already converted, when not yet converted on the other hand, to operate the processor circuit 4 so as to convert the conversion source instruction data into the converted instruction data and then store the converted instruction data in the converted software area 35.

Figure 6:
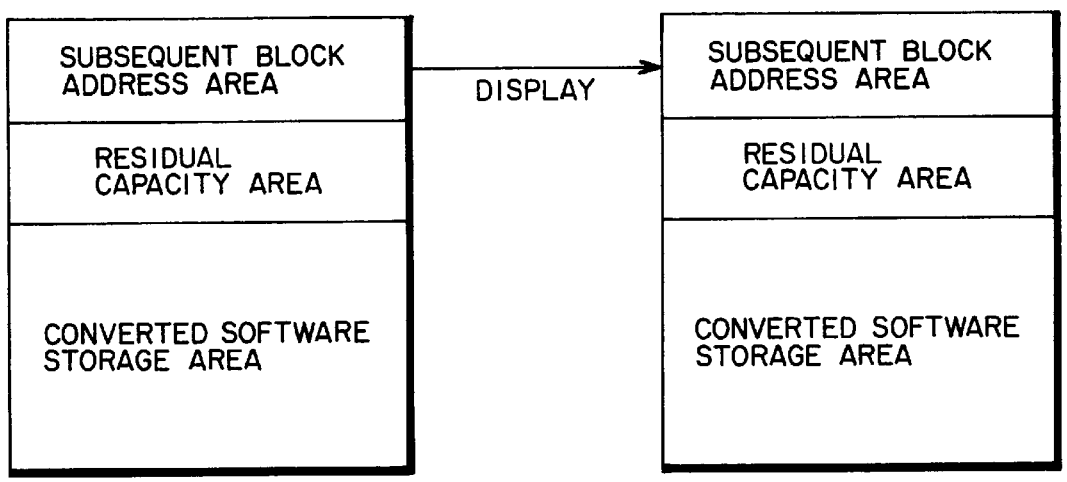
FIG. 6 is a chart showing a configuration of a block.

In other words, the conversion processing program area 34 is an area for holding a software to operate the processor circuit 4 so as to sequentially convert a program block from a leading address intended for the processing to an address with which a branch instruction begins, of the conversion source instruction data constituting the conversion source software held in the conversion source software area 32, into the converted instruction data constituting the converted software. Further, FIG. 6 illustrates a configuration of the block.

And, the converted software area 35 is an area for holding a converted software converted and generated from a conversion source software held in the conversion source software area 32, which functions as the converted software holding division. Further, the converted software area 35 is an area provided by separating the main memory circuit 3 into an unit of block.

And, this converted software area 35 contains an execution processing program area 35A. This execution processing program area 35A is an area for holding a software to operate the processor circuit 4 so as to perform the equivalent processing to the foregoing conversion source software by executing the converted software.

Further, the interruption processing program area 33 is an area to hold a software that, when an unplanned event occurs on a processing, interrupts the planned operation to process the event and thereafter makes the planned processing to be executed, which is the same as the conventional as described above.

Figure 5:
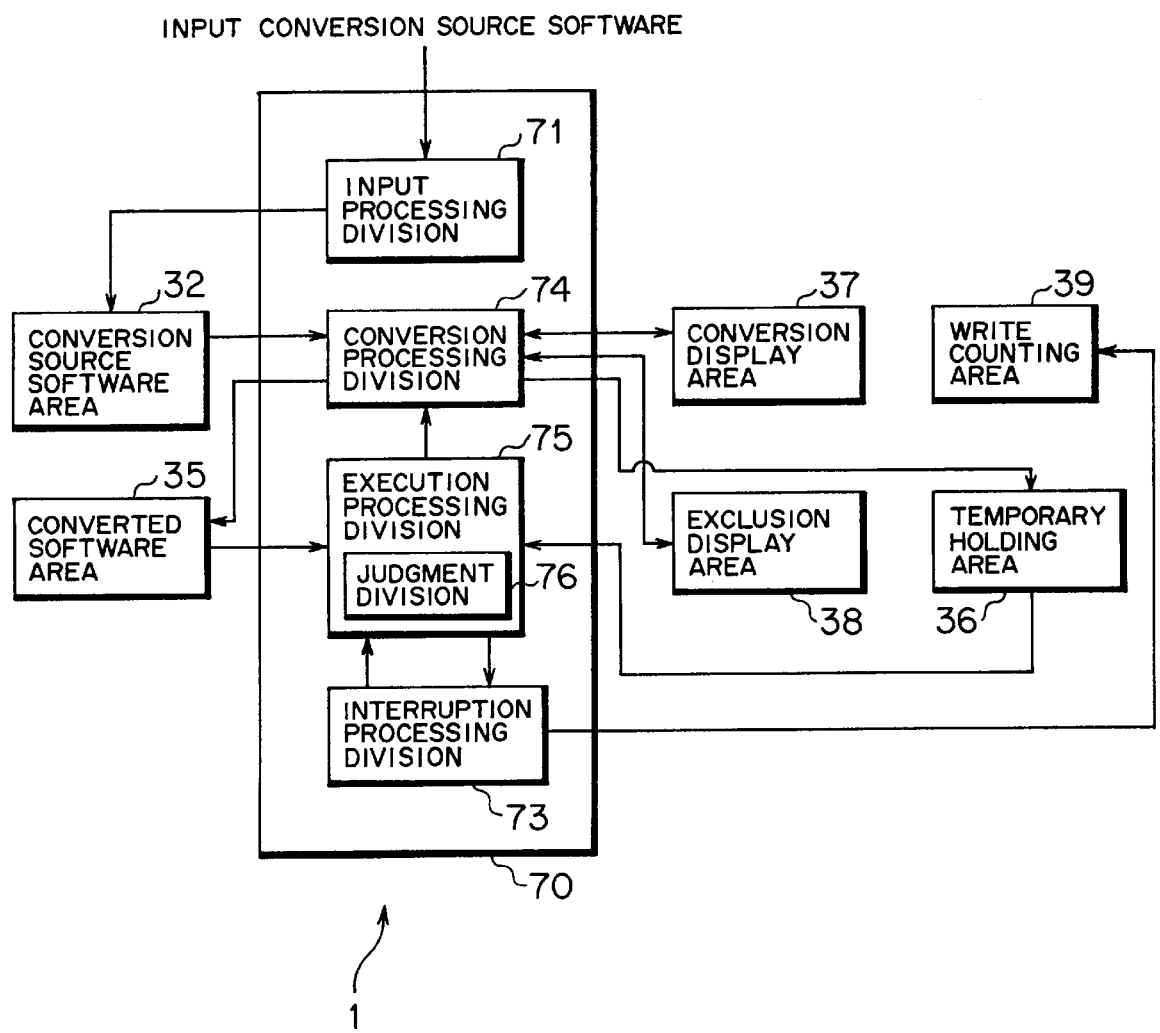
FIG. 5 is a block diagram showing a configuration of a simulation equipment relating to one embodiment of the invention.

And, the softwares held in the input processing program area 31, conversion processing program area 34 execution program area 35A, and interruption processing program area 33 each are executed by the processor circuit 4, so that these areas are made to function as the input processing division, conversion processing division, execution processing division, and interruption processing division, respectively (reference symbols 71, 74, 75 and 73, respectively, in FIG. 5).

Further, FIG. 5 shows a construction of a functional block in the simulation equipment relating to one embodiment of the invention. In FIG. 5, a reference symbol 70 shows a simulation executing division that converts a processing instructed by the conversion source software inputted through the input circuit 2 into an instruction of a converted software to execute.

And, the conversion processing division 74 and the execution processing division 75 sequentially converts a program block from a leading address intended for the processing to an address with which a branch instruction begins, of a conversion source instruction data constituting a conversion source software held in the conversion source software area 32, into converted instruction data constituting a converted software and executes the converted software thus converted; thus performing an equivalent processing to the foregoing conversion source software to accomplish a function as the program data conversion processing means.

Here, the program data conversion processing means is comprised of: a judgment division 76 (the execution processing division 75 contains the judgment division 76) that, when executing the converted software converted as above, before executing the foregoing branch instruction, judges whether or not the converted instruction data corresponding to the conversion source instruction data of the branch destination is held in the converted software area 35 by referring to the conversion display area 37 described later; a branch execution division (the execution processing division 75 contains this function) that, when the judgment division 76 judges that the converted instruction data corresponding to the conversion source instruction data of the branch destination in the foregoing branch instruction is held in the converted software area 35, executes the foregoing branch instruction on the basis of the converted instruction data held in the converted software area 35; and a branch destination conversion division (the conversion processing division 74 contains this function) that, when the judgment divisor 76 judges that the converted instruction data corresponding to the conversion source instruction data of the branch destination in the foregoing branch instruction is not held in the converted software area 35, converts the foregoing conversion source instruction data into the converted instruction data by using the foregoing branch destination address as the foregoing leading address.

Incidentally, the temporary hold area 36 is an area to hold, when the conversion source instruction data to be converted is an indirect instruction that instructs an address in the conversion source software area 32 of the conversion source instruction data to instruct an actual processing by an operand, the converted instruction data converted and generated from the conversion source instruction data that instructs the actual processing.

Figure 7:
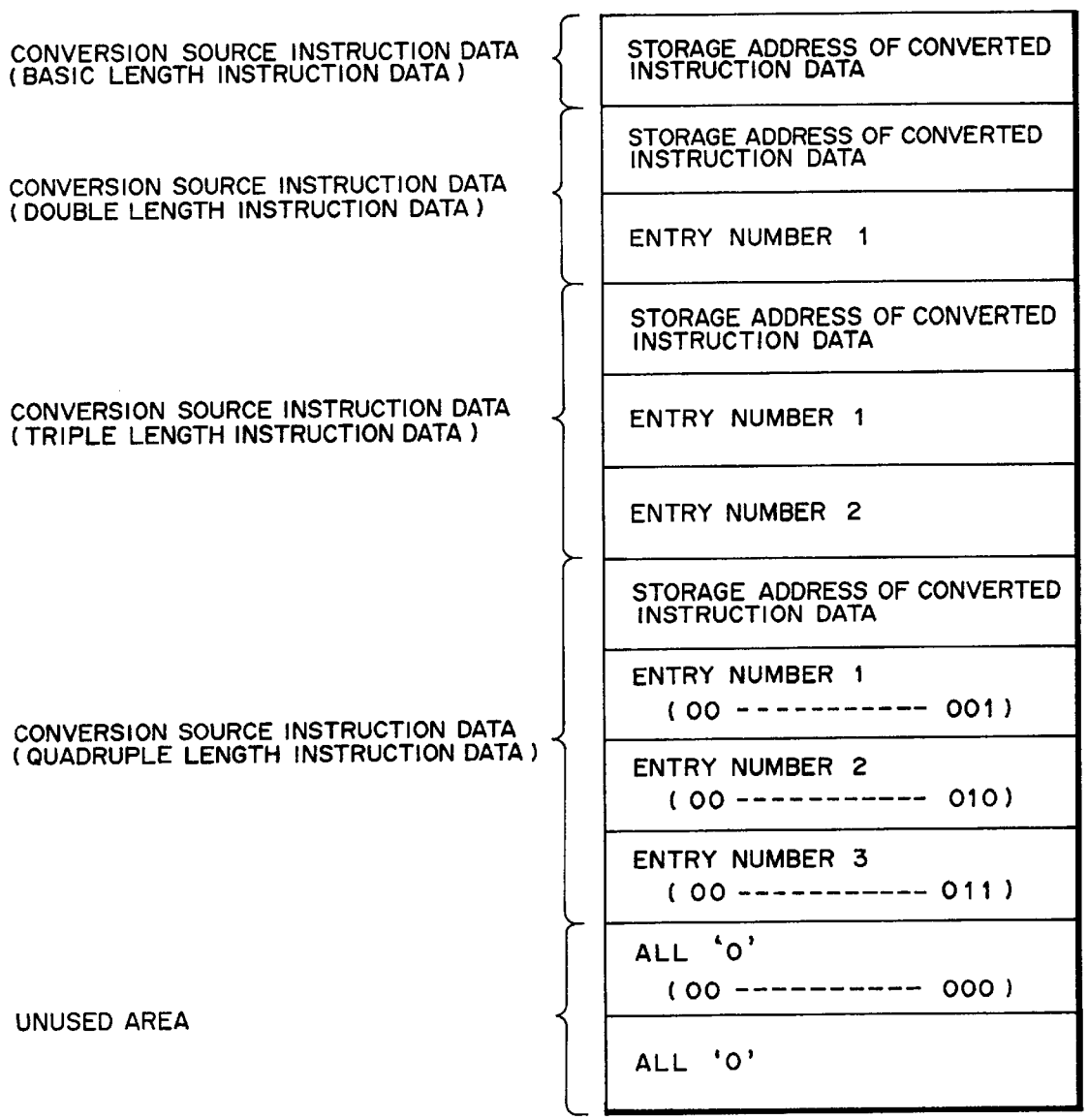
FIG. 7 is a chart showing a configuration of a conversion display area.

The conversion display area 37 is an area to contain the same number of entries as the conversion source software area 32 as shown in FIG. 7, and to display whether or not the conversion source instruction data is already converted into the converted instruction data by an entry corresponding to the leading entry in which the conversion source instruction data of the conversion source software area 32 is held. And, in this conversion display area 37, an initial set value is displayed when not yet converted; when already converted, the leading address in the storage destination of the converted instruction data corresponding to one word of the conversion source instruction data is displayed, and an entry number is displayed to a subsequent entry.

Namely, this conversion display area 37 is an area to register identification data on whether or not the conversion source instruction data to be converted by the foregoing program data conversion processing division is already converted into the converted instruction data for each of the corresponding addresses, functioning as conversion state registering division.

Further, the exclusion display area 38 is an area to display the correspondence between pages constituting the conversion source software area 32 and blocks constituting the converted software area 35 by means of the page, the leading block address, and the last block address, and to display whether or not the page is exclusively occupied by means of the lock display.

And, the write counting area 39 is an area to hold detected frequencies of the cumulative write protection violation.

And, the processor circuit 4 is comprised of an instruction counter 5 and a general purpose register 6. The processor circuit 4 reads out the softwares (namely, the softwares held in the input processing program area 31, conversion processing program area 34, execution processing program area 35A, and interruption processing program area 33) by the address specified in the instruction counter and operates the simulation equipment 1 in accordance with the instructions of the softwares; and it is connected to the main memory circuit 3.

The instruction counter 5 is a circuit that holds an address in which the instruction data read out subsequently to the main memory circuit 3 is stored, in which the data length of the instruction data is added to update the data each time when the instruction data is read out from the main memory circuit 3, which is the same as the conventional as described above.

The general purpose register 6 is a circuit to hold data necessary for various processings and control data, and to temporarily hold data that become necessary in the course of the processings instructed by the software.

And, in this embodiment, the general purpose register 6 is provided with an initial address area 61, read-out address area 62, write address area 63, and a control data area 641.

The initial address area 61 is an area to hold the leading address of the conversion source instruction data to be converted into the converted instruction data of the conversion source software.

The read-out address area 62 is an area to hold an address in the conversion source software area 32 for the conversion source instruction data converted into the converted instruction data and to add the data length of the conversion source instruction data to update the data, each time when the conversion source instruction data is converted into the converted instruction data, which is the same as the conventional as described above.

Further, the write address area 63 is an area to hold an address used for writing and reading out the converted instruction data in the converted software area 35, and to update the address each time when the converted instruction data is written or read out.

Figures 8, 9:
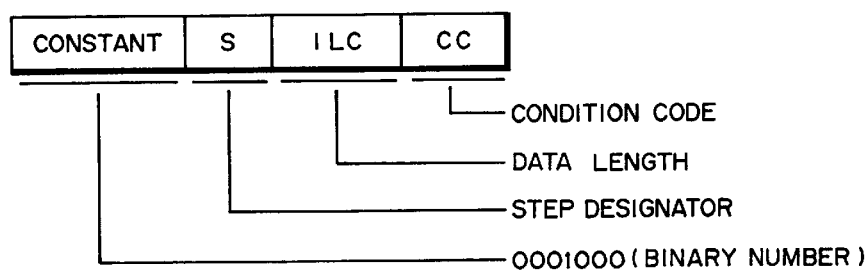
FIG. 8 is a chart showing a configuration of a exclusion display area.
FIG. 9 is a chart showing a configuration of a control data area.
Figure 10:
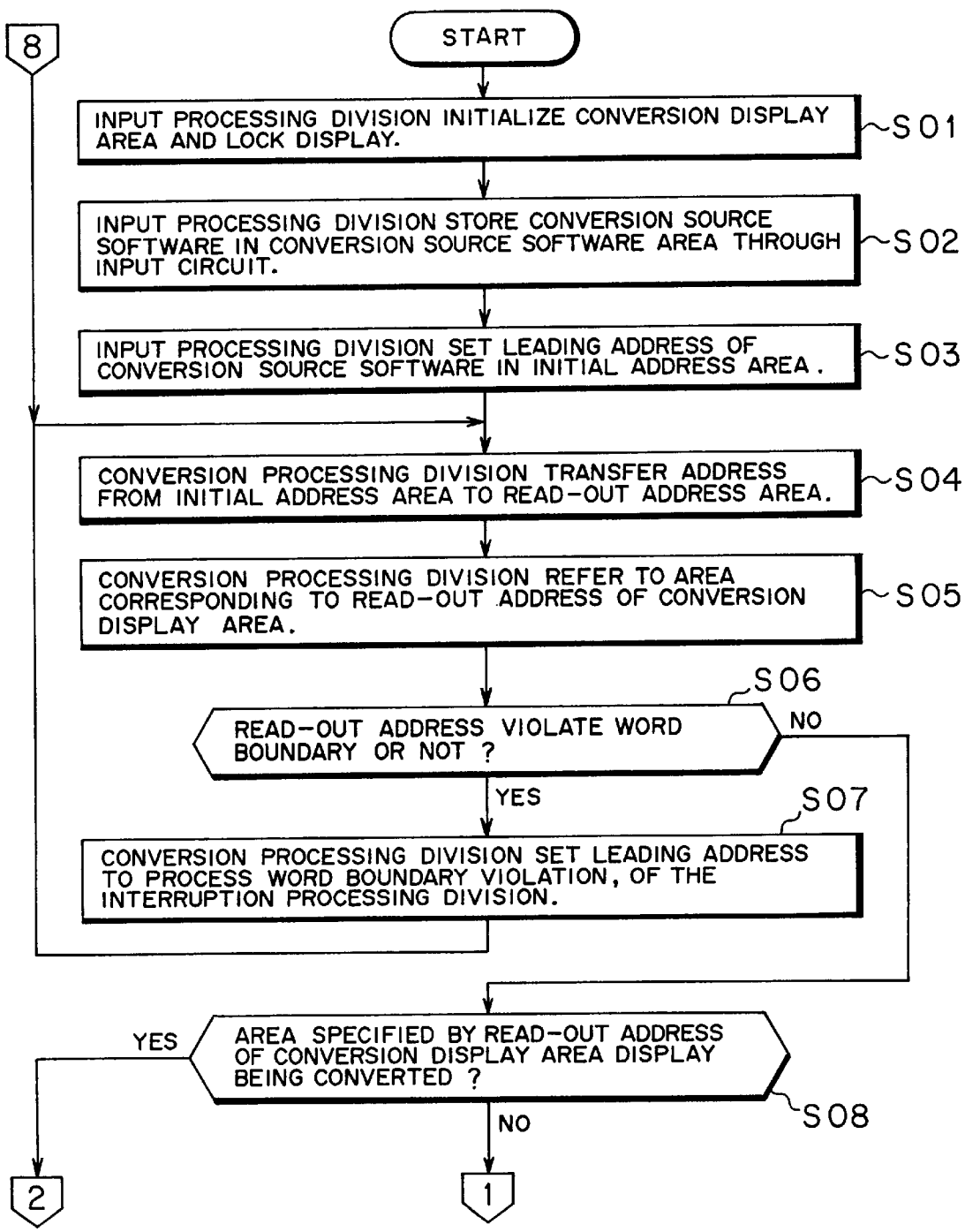
FIG. 10 is a first flow chart for explaining the operation of a simulation equipment relating to the one embodiment of the invention.
Figure 11:
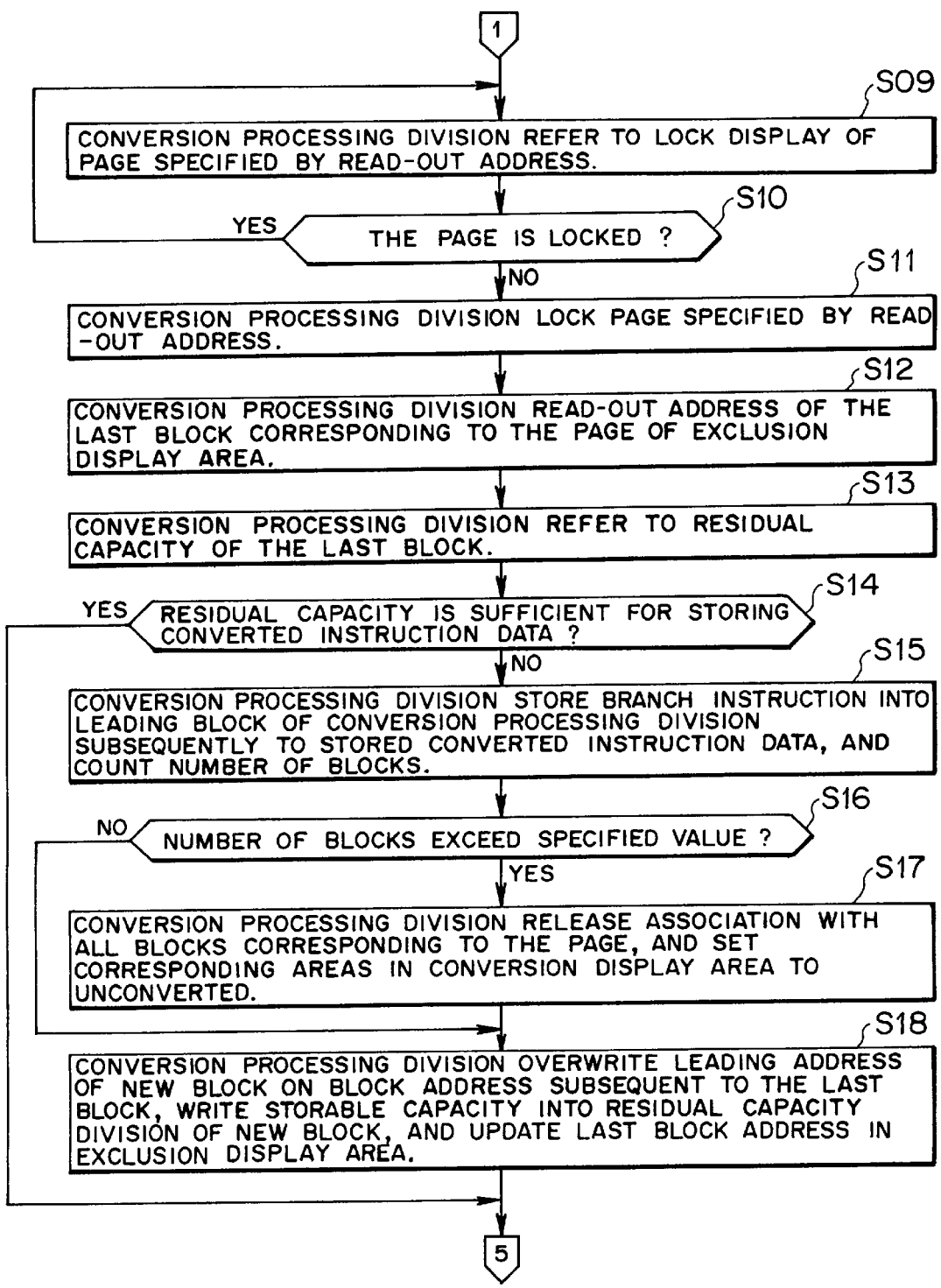
FIG. 11 is a second flow chart for explaining the operation of a simulation equipment relating to the one embodiment of the invention.
Figure 12:
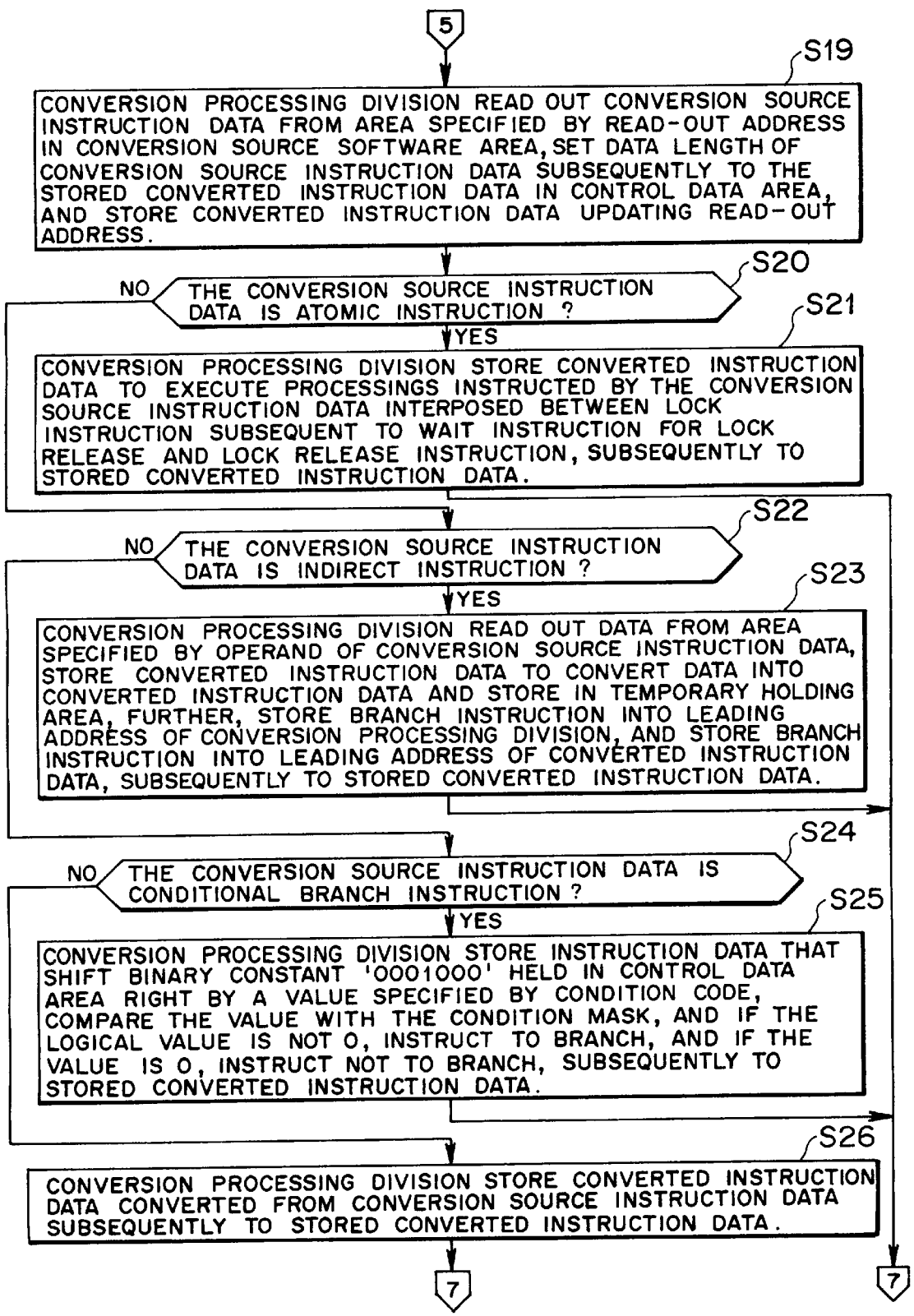
FIG. 12 is a third flow chart for explaining the operation of a simulation equipment relating to the one embodiment of the invention.
Figure 13:
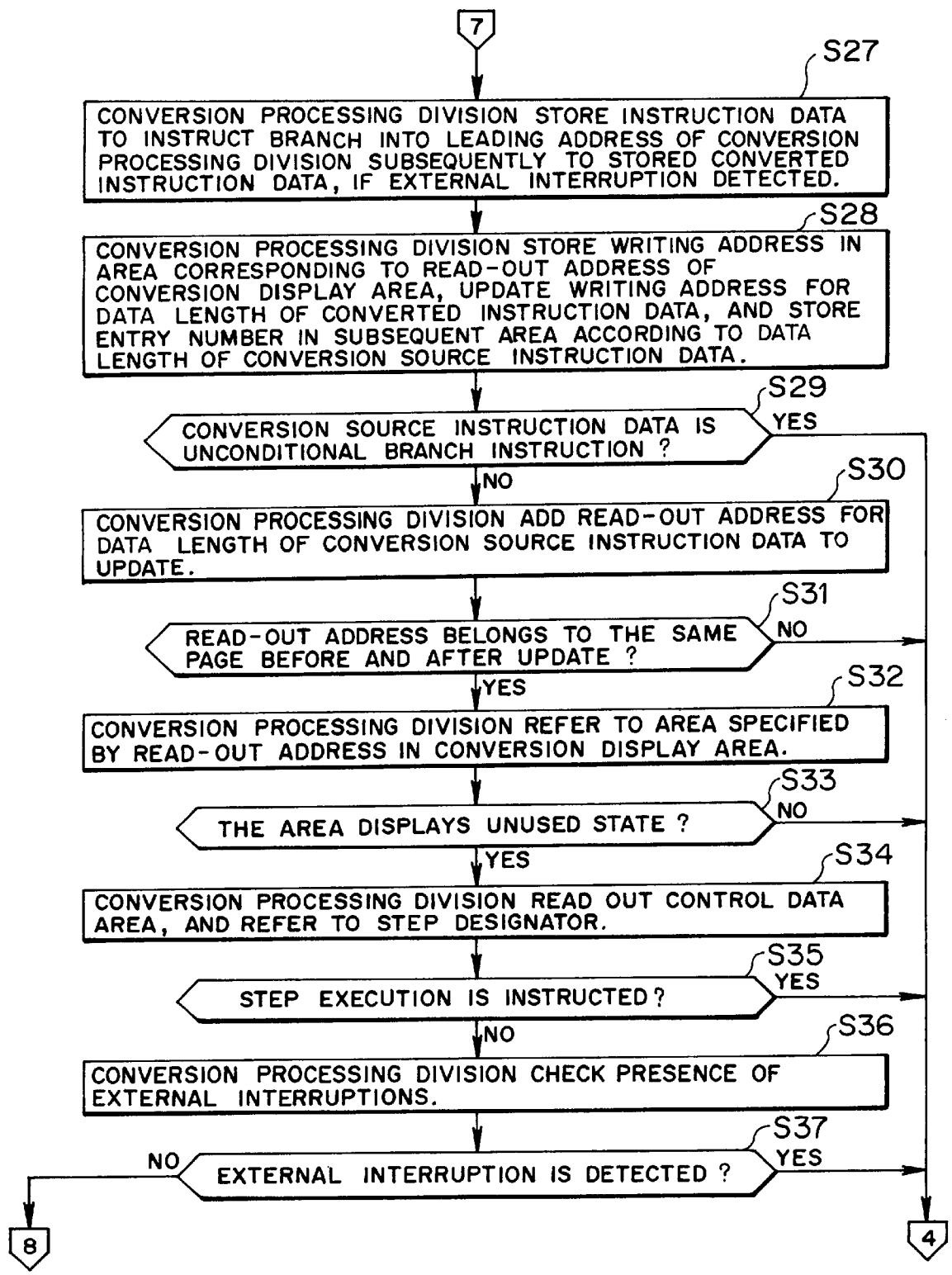
FIG. 13 is a fourth flow chart for explaining the operation of a simulation equipment relating to the one embodiment of the invention.
Figure 14:
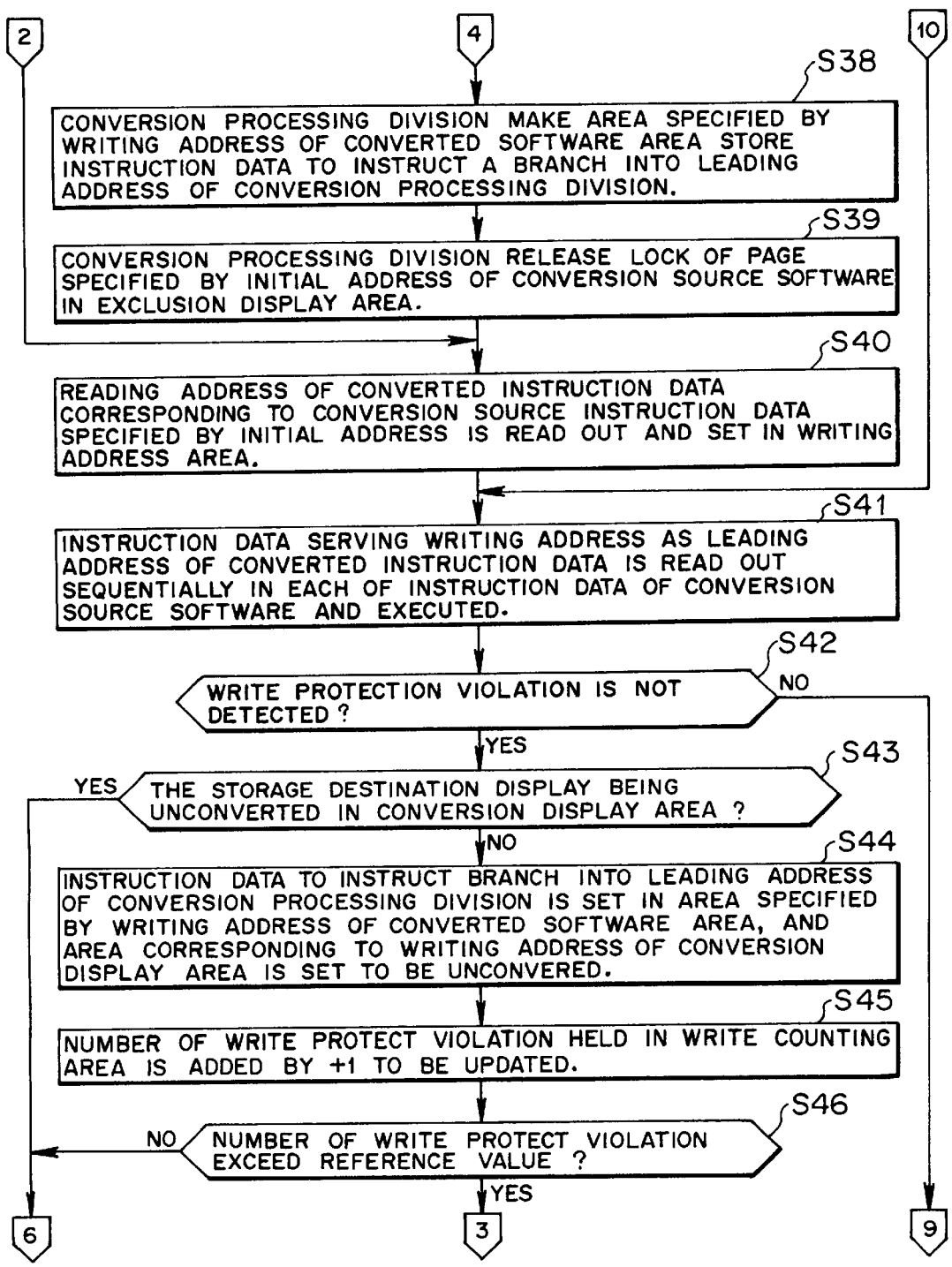
FIG. 14 is a fifth flow chart for explaining the operation of a simulation equipment relating to the one embodiment of the invention.
Figure 15:
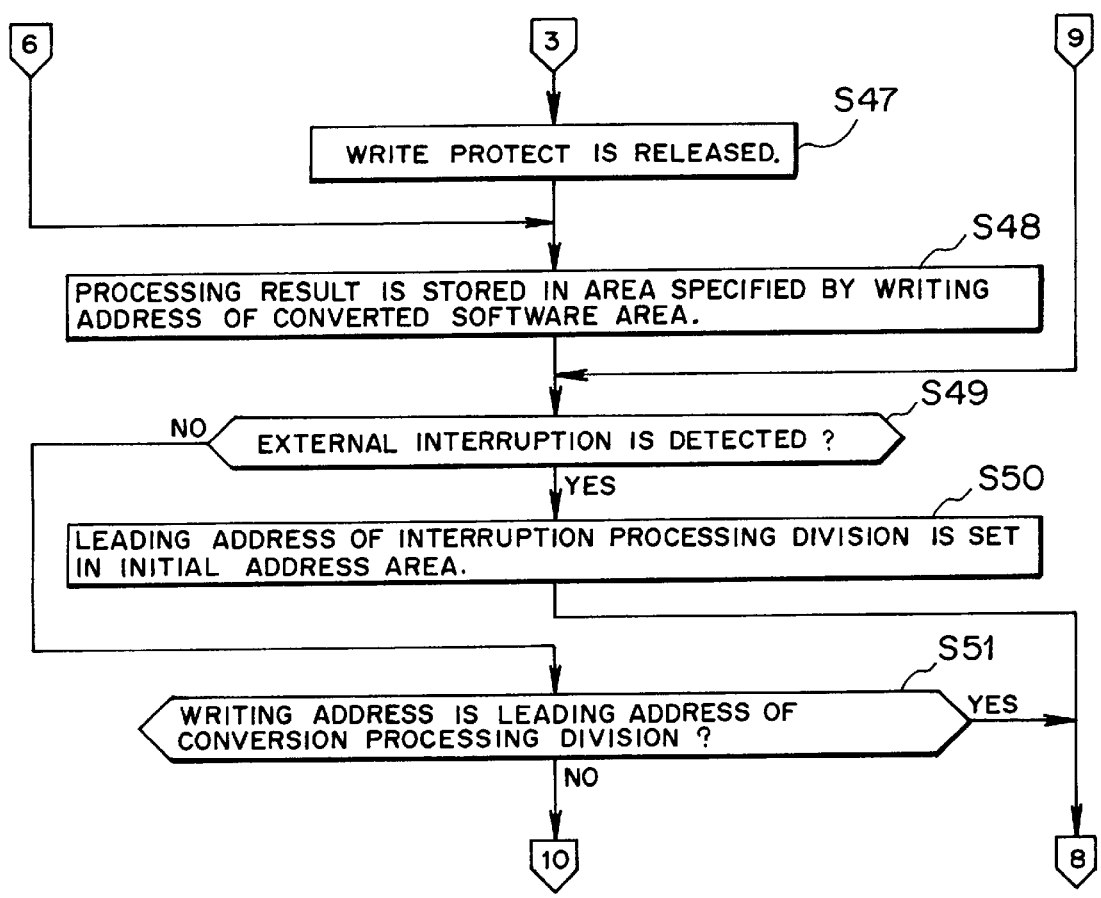
FIG. 15 is a sixth flow chart for explaining the operation of a simulation equipment relating to the one embodiment of the invention.
Figure 16:
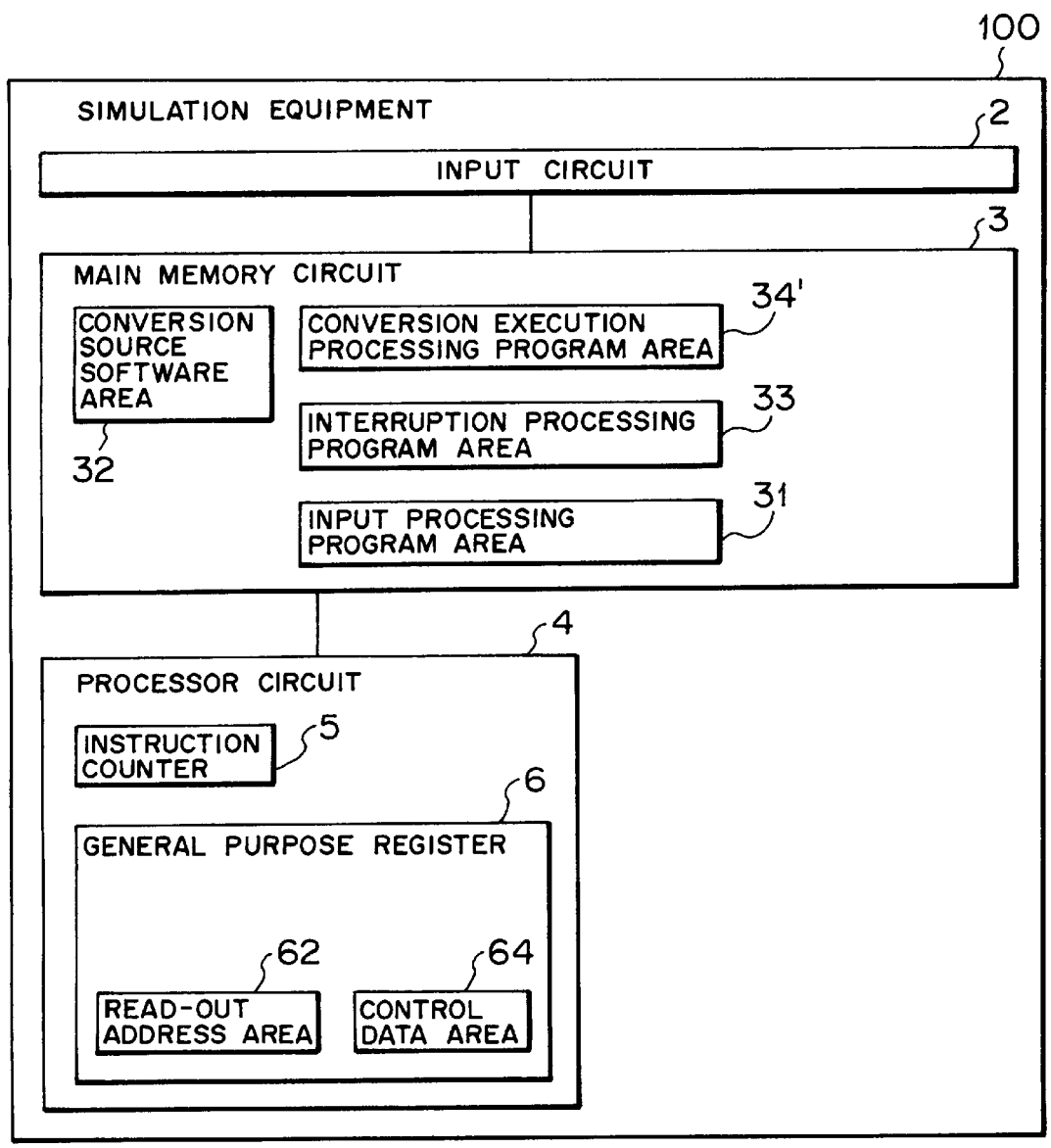
FIG. 16 is a block diagram showing a configuration of a conventional simulation equipment.
Figure 17:
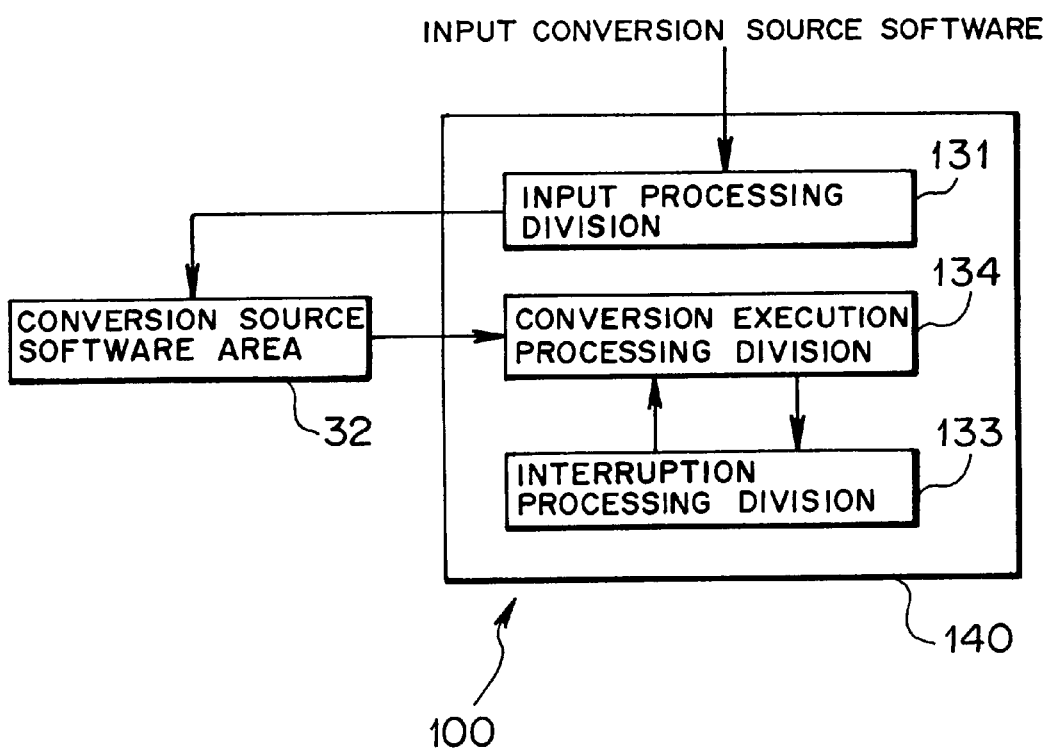
FIG. 17 is a functional block diagram showing a configuration of a conventional simulation equipment.
Figure 18:
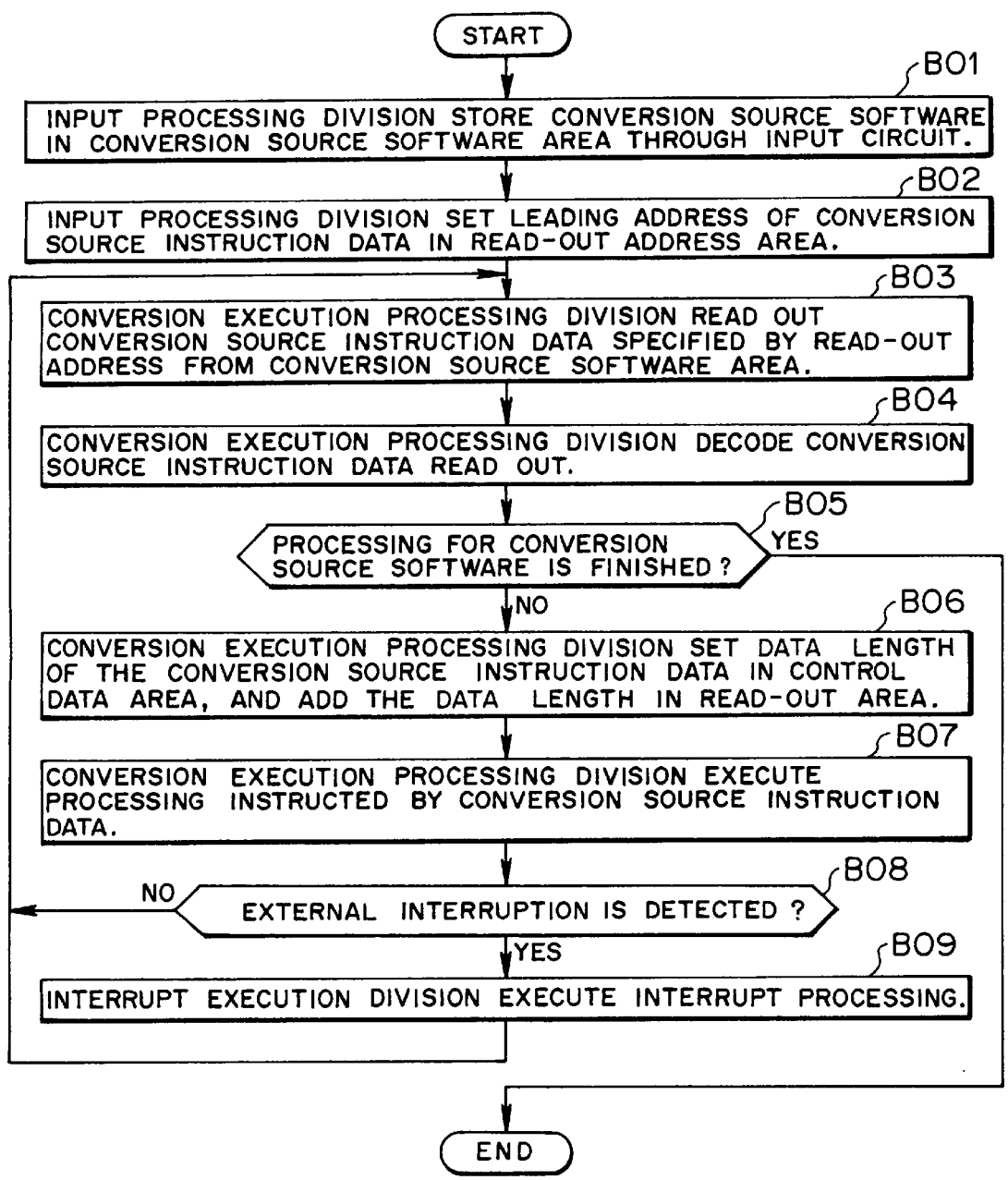
FIG. 18 is a flow chart for explaining the operation of a conventional simulation equipment.

And, the control data area 64 is an area, as shown in FIG. 9, to set: the binary constant '0001000'; the step designator that designates a step processing to temporarily break the processing each time when executing the processing instructed by the conversion source instruction data by one word; the data length of the conversion source instruction data; and the condition code gained from that a processing instructed by the conversion source instruction data is executed, which is the same as the conventional as described above.

(b) processing flow of the simulation equipment relating to the embodiment.

According to the foregoing configuration, a simulation operation is executed in the simulation equipment 1 relating to the embodiment of the invention, in which a conversion source software running on a computer of an architecture is operated on a computer of another architecture different from the former.

The operation of the simulation equipment 1 will further be described with reference to a flow chart shown in FIG. 2.

First, a data of the conversion source software input through the input circuit 2 is held in the conversion source software area 32 by the input processing division 71 (step A 01).

Next, the conversion processing division 74 sequentially converts a program block from a leading address intended for the processing to an address with which a branch instruction begins, of a conversion source instruction data in the conversion source software, into a converted software (step A02).

Further, the converted instruction data constituting the converted software converted in the step A02 is held in the converted software area 35 (step A03).

Here, in the conversion display area 37, whether or not the conversion source instruction data to be converted in the step A02 is already converted into converted instruction data is registered for each of the corresponding addresses (step A04).

And, the converted software converted in the step A02 is executed by the execution processing division 75 (step A05).

When executing the converted software in the step A05, the judgment division 75 judges whether the converted instruction data to be executed is a branch instruction or not (step A06).

When the converted instruction data to be executed is judged to be a branch instruction (YES route of step A06), the judgment division 76 judges whether or not the conversion source instruction data of the branch destination is converted into the converted instruction data by referring to the registered result in the step A04 (step A07).

And, when the step A07 judges that the conversion source instruction data of the branch destination is converted into the converted instruction data ("converted" route of the step A07), the execution processing division 75 executes the foregoing branch instruction on the basis of the converted instruction data held in the step A03 (step A08).

Further, when the step A07 judges that the conversion source instruction data of the branch destination is not converted into the converted instruction data ("unconverted" route of the step A07), after the conversion processing division 74 converts the foregoing conversion source instruction data into the converted instruction data by serving the address of the foregoing branch destination as the foregoing leading address, the execution processing division 75 executes the foregoing branch instruction (step A09).

Namely, the simulation method of the invention in the simulation equipment 1 comprises the following steps: a conversion step for converting a program data of the first software into a program data of the second software that can run on the computer of the second architecture; a second software holding step for holding a program data constituting the second software converted in the conversion step; a conversion state registering step for registering whether or not a program data to be converted in the conversion step is already converted into the program data constituting the second software; a judgment step for judging, by referring to a registered result in the conversion state registering step, whether or not the program data of the first software to be converted is already converted into the program data constituting the second software; and an execution step for executing, when the program data of the first software is judged to be already converted into the program data constituting the second software in the judgment step, the program data constituting the second software held in the second software holding step, and when the program data of the first software is judged not to be converted into the program data constituting the second software in the judgment step, after the conversion step converts the program data of the first software into the program data of the second software, the program data constituting the second software.

In this embodiment of the invention, the functions equivalent to the foregoing step A 01 through the step A09 are achieved by the operations of the processor circuits 4A, 4B, in which a simulation program recorded on a recording medium (not illustrated) for a disk drive or the like in the computer is read out on the main memory circuit 3 and the simulation program is started to be executed by the processor circuits 4A, 4B.

Here, the simulation program is a program to execute a simulation operation in which the conversion source software running on a computer of an architecture converted into the converted software is operated on a computer of another architecture and the converted software is operated.

Concretely, the simulation program is to make a computer achieve the following: a conversion source software holding function to hold the data of the conversion source software (the step A 01 is equivalent to this function); a conversion function to sequentially convert a program block from a leading address to an address with which a branch instruction begins, of a conversion source instruction data in the conversion source software, into a converted software that can run on a computer of another architecture (the step A02 is equivalent to this function); a converted software holding function to hold the converted instruction data constituting the foregoing converted software converted by the conversion function (the step A03 is equivalent to this function); a conversion state registering function to register whether or not the conversion source instruction data to be converted by the conversion function is already converted into the converted instruction data constituting the converted software for each of the corresponding addresses (the step A04 is equivalent to this function); an execution function to execute the converted software converted by the conversion function (the step A05 is equivalent to this function); a judgment function to judge, when executing the foregoing converted software, whether or not the converted instruction data to be executed is a branch instruction (the step A06 is equivalent to this function); a judgment function to judge, when executing the foregoing converted software in the execution function, before executing the foregoing branch instruction, whether or not the conversion source instruction data of the branch destination is converted into the converted instruction data constituting the converted software by referring to the registered result in the conversion state registering function (the step A07 is equivalent to this function); a branch execution function to execute, when the conversion source instruction data of the branch destination is judged to be converted into the converted instruction data constituting the converted software by the judgment function, the foregoing branch instruction on the basis of the converted instruction data held by the converted software holding function (the step A08 is equivalent to this function); and a branch destination conversion function to execute, when the conversion source instruction data of the branch destination is judged not converted into the converted instruction data constituting the converted software by the judgment function, after converting the conversion source instruction data of the foregoing conversion source software into the converted instruction data of the converted software by serving the address of the foregoing branch destination as the foregoing leading address, the foregoing branch instruction (the step A09 is equivalent to this function).

Namely, the simulation program is to make a computer achieve the followings: a conversion function for converting a program data of the first software into a program data of the second software that can run on the computer of the second architecture; a second software holding function for holding a program data constituting the second software converted by the conversion function; a conversion state registering function for registering whether or not a program data to be converted by the conversion function is already converted into the program data constituting the second software; a judgment function for judging, by referring to a registered result by the conversion state registering function, whether or not the program data of the first software to be converted is already converted into the program data constituting the second software; and an execution function for executing, when the program data of the first software is judged to be already converted into the program data constituting the second software by the judgment function, the program data constituting the second software held by the second software holding function, and when the program data of the first software is judged not to be converted into the program data constituting the second software by the judgment function, after the conversion function converts the program data of the first software into the program data of the second software, the program data constituting the second software.

Further, this simulation program is recorded on the computer readable recording medium such as a CD-ROM, and the program is installed from this computer readable recording medium into a disk drive or the like in a computer of another architecture before use.

Further, the flow of the simulation processing of the invention will be described in detail with reference to FIG. 10 through FIG. 15, using an example in which the simulation is executed by the processor circuit 4A.

In an initial state, the correspondence between the pages constituting the conversion source software area 32 in the exclusion display area 38 and the blocks in the converted software area 35 is displayed so as to contrast the page, the address of the leading block, and the address of the last block.

A lock display for displaying whether or not each of the pages constituting the conversion source software area 32 in the exclusion display area 38 is exclusively occupied is set to the initial state (state to indicate that the lock is released and the page is not occupied) by the input processing division 71 to run the processor circuit 4A (step S01).

A conversion source software is stored in the conversion source software area 32 through input circuit 2 by the input processing division 71 (step S02).

A leading address of the conversion source instruction data to be converted into the converted software, of the conversion source software stored in the conversion source software area 32 is set as an initial address in an initial address area 61A (step S03).

An address read out from the initial address area 61A is transferred to a read-out address area 62A as the read-out address by the conversion processing division 74 to run the processor circuit 4A (step S04).

An area specified by an address corresponding to a read-out address in the conversion display area 37 is referred to by the conversion processing division 74 (step S05).

If the address corresponding to the read-out address coincides with the word boundary in the conversion display area 37, the read-out address is judged to coincide with the word boundary is in the conversion source software area 32 by the conversion processing division 74, and the process goes to the step 508. If the address corresponding to the read-out address does not coincide with the word boundary in the conversion display area 37, the read-out address is judged not to coincide with the word boundary in the conversion source software area 32, and the process goes to the step S07 (step S06).

A leading address of a word boundary violation processing software in the interruption processing division 73 is set in the initial address area 61A by the conversion processing division 74, and the process returns to the step S04 (step S07).

The area specified by the address corresponding to the read-out address in the conversion display area 37 is referred to by the conversion processing division 74, and if the conversion source instruction data stored in an address specified by the read-out address in the conversion source software area 32 displays not being converted into the converted instruction data (namely, unconverted), the process goes to the step S09 for converting the conversion source instruction data into the converted instruction data. If the conversion source instruction data stored in then address displays being converted into the converted instruction data (namely, already-converted), the process goes to the step S40 for executing the corresponding converted instruction data, using the conversion source instruction data specified by the initial address as a leader (step S08).

A lock display of the page specified by the read-out address in the exclusion display area 38 is referred to by the conversion processing division 74, in order to check whether or not the page specified by the read-out address in the conversion source software area 32 is exclusively occupied by the other processor; and if exclusively occupied (namely, locked), waiting until the lock is released, the process goes to the step S11 (step S09~S10).

The lock display of an area corresponding to the page specified by the read-out address in the exclusion display area 38 is set in the lock state by the conversion processing division 74, and the page is exclusively occupied by the processor circuit 4A (step S11).

The address of the last block constituting the converted software area 35, which is held in the area corresponding to the page specified by the read-out address in the exclusion display area 38, is read out by the conversion processing division 74 (step S12).

A remaining storable capacity of storing the converted instruction data from the residual capacity division of the last block is read by the conversion processing division 74 (step S13).

A capacity in the conversion source software area 32 generated when converting the conversion source instruction data held in the address specified by the read-out address into the converted instruction data is calculated by the conversion processing division 74, and the generated capacity is compared with the remaining storable capacity of storing the converted instruction data displayed in the residual capacity division.

If the storable capacity is larger than the generated capacity, the storage area being sufficient, the process goes to the step S19. If the storable capacity is smaller than the generated capacity, the process goes to the step S15 to increase the storable capacity by adding new blocks (step S14).

The converted instruction data to instruct a branch into the leading block of the conversion processing division 74 is stored subsequently to the stored converted instruction data (the final stored converted instruction data), addresses are traced sequentially from the leading block to the following blocks, and the number of the blocks corresponding to the pages specified by the read-out address is counted by the conversion processing division 74 (step S15).

If the number of the blocks exceeds a specified value, the conversion processing division 74 advances the process to the step S17, and if the number of the blocks is within the specified value, the conversion processing division 71 advances the process to the step S18 (step S16).

The conversion processing division 74 releases the association by the address of the block subsequent to the block corresponding to the page, and initializes the entire areas corresponding to the pages, in the conversion display area 37 (step S17).

The conversion processing division 74 overwrites a leading address of a new block in the block address subsequent to the last block, writes a remaining storable capacity of the new block into the residual capacity division, and overwrites the leading address of the new block in an area where the address of the last block is displayed, in the exclusion display area 38 (step S18).

The conversion processing division 74 reads out and decodes the conversion source instruction data from the area specified by the read-out address in the conversion source software area 32, instructs to store the data length of the conversion source instruction data into the control data area 64A, subsequently to the stored converted instruction data in the converted software area 35, and stores the converted instruction data that instructs to add the instruction data length on the read-out address to store the result in the read-out address area 62A (step S19).

If the conversion source instruction data is composed of compound instructions, the so-called atomic instructions, instructions combined by a plurality of simple processings, the process goes to the step S 21 to convert the conversion source instruction data into the instruction data intrinsic to the atomic instructions. If the conversion source instruction data is not composed of the atomic instructions, the process goes to the step S22 (step S20).

A converted instruction data to instruct to wait until the lock is released, converted instruction data to instruct to lock, converted instruction data to process to combine a plurality of simple processings instructed by the foregoing conversion source instruction data, and converted instruction data to instruct to release the lock are stored subsequently to the stored converted instruction data in the converted software area 35 by the conversion processing division 74, and the process goes to the step S27 (step S21).

If the conversion source instruction data is composed of indirect instructions to specify an address in which the conversion source instruction data to instruct actual processings is stored by means of the operand, the process goes to the step S23 to convert the conversion source instruction data into the instruction data intrinsic to the indirect instructions; if the conversion source instruction data is not composed of indirect instructions, the process goes to the step 24 (step S22).

A converted instruction data to instruct to read out the conversion source instruction data that instructs actual processings from an address specified by the operand of the conversion source instruction data in the conversion source software area 32, converted instruction data converted from the conversion source instruction data to be stored in the temporary hold area 36, converted instruction data to instruct a branch into the leading address of the conversion processing division 74, converted instruction data to instruct a branch into an address indicated by the initial address held in the initial address area 61 are stored subsequently to the stored converted instruction data in the converted software area 35 by the conversion processing division 74, and the process goes to the step S27 (step S23).

If the conversion source instruction data is composed of conditional branch instructions, the process goes to the step S25, if the conversion source instruction data is not composed of conditional branch instructions, the process goes to the step S26 (step S24).

A converted instruction data to instruct to shift the binary constant '0001000' held in the control data area 64A right by the number of digits specified by the condition code, and converted instruction data to instruct to compare a value gained from a result that the binary constant '0001000' is shifted right by the number of digits specified by the condition code with the condition mask, and if the logical value is not 0, to branch into an address specified by the operand, if the logical value is 0, to advance to the next address are stored subsequently to the stored converted instruction data in the converted software area 35 by the conversion processing division 74, and the process goes to the step S27 (step S25).

The converted instruction data to execute processings instructed by the conversion source instruction data is stored subsequently to the stored converted instruction data in the converted software area 35 by the conversion processing division 74, and the process goes to the step S27 (step S26).

A converted instruction data to instruct to check the presence of external interruptions, and if an external interruption is detected, to branch into the leading address of the conversion processing division 74 is stored subsequently to the stored converted instruction data in the converted software area 35 by the conversion processing division 74 (step S27).

A writing address is stored in an entry corresponding to the entry specified by the read-out address of the conversion source software area 32 in the conversion display area 37, an entry number is stored in the entry subsequent to the entry in the conversion display area 37 in accordance with the word length of the conversion source instruction data, and the word length of the converted instruction data held in the converted software area 35 is added to the writing address to be stored in the writing address area 63A by the conversion processing division 74 (step S28).

The conversion source instruction data of the conversion source software area 32, read out from the entry specified by the read-out address, are checked as to being unconditional branch instructions or not; if unconditional branch instructions, the process goes to the step S38, and if not unconditional branch instructions, the process goes to the step S30 (step S29).

The word length of the conversion source instruction data is added to the read-out address to be stored in the read-out address areas 62A by the conversion processing division 74 (step S30).

The page containing the read-out address before update is compared with the page containing the read-out address after update; if both of the addresses are on the same page, the process goes to the step S32, and if both are on the different pages, the process goes to the step S38 (step S31).

An area specified by an address corresponding to a read-out address in the conversion display area 37 is referred to by the conversion processing division 74, if the conversion source instruction data stored in an address specified by the read-out address in the conversion source software area 32 display not to be converted into the converted instruction data (namely, unconverted), the process goes to the step S34 in order to continue the conversion of the conversion source instruction data into the converted instruction data, and if the conversion source instruction data stored in the address display to be converted into the converted instruction data (namely, already-converted), the process goes to the step S38 in order to execute the corresponding converted instruction data, serving the conversion source instruction data specified by the initial address as a leading address (step S32–S33).

The conversion processing division 74 refers to a step designator in the control data area 64A (step S34).

If the step designator designates a step operation, the process goes to the step S38; if the step designator does not designate a step operation, the process goes to the step S36 (step S35).

The conversion processing division 74 checks whether external interruptions are generated or not (step S36).

If an external interruption is detected, the process goes to the step S38; if an external interruption is not detected, the process returns to the step S04 (step S37).

The conversion processing division 74 makes an area specified by a writing address in the converted software area 35 store the converted instruction data to instruct a branch into the leading address of the conversion processing division 74 (step S38).

The conversion processing division 74 sets the lock display corresponding to the page specified by the initial address of the exclusion display area 38 into a nonlock state (step S39).

A leading address of the converted instruction data converted and generated from the conversion source instruction data, corresponding to the conversion source instruction data held in an area specified by the initial address of the conversion source software area 32, is read out from the conversion display area 37, which is set in the writing address area 63A (step S40).

The converted instruction data serving the writing address as the leading address is read out from the converted software area 35 sequentially in each of the conversion source instruction data to be executed (step S41).

In the process of executing the step S41, if a storage destination address specified by the converted instruction data is a subject for the write protection and a write protection violation is detected, the process goes to the step 49, and if a write protection violation is not detected, the process goes to the step 43 (step S42).

If the unconverted is displayed in an area specified by the storage destination address, in the conversion display area 37, the process goes to the step S48, and if the already-converted is displayed, the process goes to the step S44 (step S43).

The converted instruction data to instruct a branch into the leading address of the conversion processing division 74 is stored in the area specified by the writing address in the converted software area 35, and an area storing the writing address of the conversion display area 37 is set to be unconverted (step S44).

The number of write protect occurred is read out from the write counting area 39, and +1 is added to the number of write protect occurred, which is stored in the write counting area 39 (step S45).

If the number of write protect occurred is a reference value or more, the process goes to the step S47, and if it is less than the reference value, the process goes to the step S48 (step S46).

Namely, if the number of write protect occurred is the reference value or more, the write protect is released (step S47), and if it is less than the reference value, the processing result is stored in the area specified by the writing address, in the converted software area 35 (step S48).

Further, the presence of external interruptions is checked, if an external interruption is detected, the process goes to the step S50, and if an external interruption is not detected, the process goes to the step S51 (step S49).

Namely, if an external interruption is detected, a leading address of the interruption processing division 73 (namely, interruption processing program) is set in the initial address area 61A, and the process returns to the step S04 (step S50).

Further, if an external interruption is not detected, and if the writing address indicates the leading address of the conversion processing division 74, the process returns to the step S04; if the writing address does not indicate the leading address of the conversion processing division 74, the process returns to the step S41 (step S51).

Thus, according to the simulation equipment 1 relating to the embodiment of the invention, a program block from a leading address to an address with which a branch instruction begins, of a conversion source instruction data constituting a conversion source software, is sequentially converted into a converted instruction data constituting a converted software, and the converted software is executed. Thereby, it becomes unnecessary to convert the conversion source instruction data into the converted instruction data word by word and to execute the processing instructed by the converted instruction data. Therefore, it is possible to significantly reduce the processing time required for the simulation operations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

said conversion indicating means serving to indicate no conversion in its initialized state;

said conversion processing means being operable to refer to said conversion indicating means for the storage address of the target instructions to be processed and operable to convert, in response to the indication of no conversion on said conversion indicating means, the target instructions into the main instructions to store in said main data holding means, said conversion on processing means being also operable to store the starting address of the storage destination for the main instructions in the address corresponding to the storage address of the target instructions in said conversion indicating means.

2. An apparatus for emulation according to claim 1, wherein said conversion indicating means has the same number of entries as said target instruction holding means and indicates an entry number on an entry following to an entry corresponding to an entry in which the target instructions are held if the target instructions monopolizes a plurality of entries of said target data holding means.

3. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

interruption processing means for performing an interruption process;

said conversion processing means being operable to convert word boundary violation processing software of said interruption processing means into the main software, which is to be stored in said main data holding means, when said conversion processing means detects that an address of said conversion indicating means corresponding to a read-out address of the target instruction data violates a word boundary.

4. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

wherein, if target instruction data read from said target data holding means is instruction data giving anticipation that no instruction data is held in an address of said target data holding means specified by a subsequent read-out address, said conversion processing means stores an instruction data to return to the start of processing procedure of said conversion processing means in said main data holding means as the main instruction data, with instruction data converted from the target instruction data next to the main instruction data, and branches processes so that a process specified by the converted instruction data can be executed from the starting address of said main data holding means.

5. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

wherein, when an address used in reading out target instruction data from said target data holding means and an address used in reading a subsequent target instruction data attribute to different pages, said conversion processing means stores instruction data to be returned to the start of the processing procedure of said conversion processing means in said main data holding means as the main instruction data, next to the last-stored main instruction in said main data holding means, and branches process so that a process specified by the main instructions can be executed from the starting address of said main data holding means.

6. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

wherein, when an external interruption is detected during the conversion of the target instructions into the main instructions, said conversion processing means stores instruction data to be returned to the start of processing procedure of said conversion processing means in said main data holding means as the main instructions, next to the last-stored main instruction in said main data holding means, and branches processes so that a process specified by the main instruction can be executed from the starting address of said main data holding means.

7. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

said target holding means being separated into a plurality of pages;

said main data holding means being separated into a plurality of blocks associated with succeeding addresses; and an exclusion indicating means for indicating a correspondence between the page and the block by means of an address of a leading block and an address of a last block for each page;

wherein said conversion processing means reads target instructions from said target data holding means, before converting the target instructions into the main instructions, calculates a residual capacity of said main data holding means required for storing the main instructions, and when the residual capacity is insufficient for storing the main instructions, connects a new block in association with a last block, and stores an address of the new block as the address of the last block, and thereafter, converts the target instructions into the main instructions to be stored in said main data holding means.

8. An apparatus according to claim 7, wherein, when the residual capacity is insufficient for storing the main instructions, said conversion processing means counts the number of blocks corresponding to the number of the pages, and if the number of the blocks does not exceed a preset value, said conversion processing means connects the new block in association with the last block.

9. An apparatus according to claim 7, further comprising a plurality of processor circuits, wherein said exclusion display means displays whether or not the pages are exclusively occupied by a lock display for every page.

10. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

wherein, when the target instructions are composite instructions composed of a plurality of simple processes, said conversion processing means converts the target instructions into main instructions including an instruction to wait until a lock is released, an instruction to lock, a plurality of instructions for a plurality of the simple processes, and an instruction to release a lock.

11. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

control data holding means for holding a step designator that indicates the presence of a step execution instruction, wherein said conversion processing means stores, when a step execution is instructed by said step designator, and each time when converting one word of the target instruction into the main instructions, an instruction data to return to the start of a processing procedure of said conversion processing means in said main data holding means as the main instruction next to the last-stored main instruction in said main data holding means, and branches processes so that a process specified by the main instruction can be executed from a starting address of said main data holding means.

12. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

control data holding means for holding a binary constant '0001000';

said conversion processing means being operable to generate as the main instructions: an instruction to shift, when the main instruction is a conditional branch instruction, the binary constant right by the number of bits specified by a condition code, and an instruction for a branch into an instruction held in an address specified by an operand of the target instruction, when comparing the binary constant shifted right by the number of bits specified by the condition code with a condition mask does not lead a logical value to 0.

13. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

temporary holding means for temporarily holding main instructions converted and generated from the target instruction;

wherein when the conversion source instruction data is an indirect instruction to specify by an operand an address in which the target instructions for actual processes is stored, said conversion processing means stores instructions for reading out the target instructions for the actual processes from an address specified by the operand, an instruction for temporarily storing main instructions converted from the target instructions in said temporary holding means, and an instruction to return to the start of a processing procedure of said conversion processing means in the main data holding means as the main instructions, and branches processes so that a process specified by the main instruction can be executed from a starting address of said main data holding means.

14. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

wherein said conversion processing means refers to an area corresponding to an address specified as a storage destination by an operand of the target in said conversion indicating means, in order to detect whether or not a target instruction is an instruction for a change of the target instruction already converted into the main instruction, stores, when conversion is indicated, an instruction to be returned to the start of a processing procedure of said conversion processing means in said main data holding means as the main instruction, and initializes an entry corresponding to a storage destination address of the target instruction in said conversion display means to indicate no conversion.

15. An apparatus for emulation in which target software dedicated to a target computer is converted into main software to be executed on a main computer, comprising:

target data holding means for holding the target conversion source software, which is composed of target instructions to be stored in target storage addresses;

conversion indicating means, responsive to the conversion of the target software into the main software, for indicating a starting address of a plurality of addresses, into which main instructions of the main software are to be stored, as a destination address corresponding to the storage address of said target instruction holding means in which the target instructions are stored;

main data holding means for holding the main software with the main instructions to be stored in the addresses of said main data holding means; and conversion processing means for referring to the destination address of said conversion indicating means, which address corresponds to the source storage address of the target instructions, and branching part of the main instructions as a designated routine if said starting address of said conversion indicating means at which the main instructions are stored has been indicated by said conversion indicating means;

wherein said conversion processing means sets so as to generate a write protection interruption when registering a leading address of the main instruction in said conversion indicating means and when a write is generated to the address, in order to detect if target instructions are instruction data for a change of the target instructions already converted into the main instructions, recognizes a conversion instruction from the target instructions into the main instructions, instructing the change of the target instructions already converted into the main instructions, by a write protection violation interruption, when converting the target instructions into the main instructions to store in said main data holding means, and stores, when a write protection violation interruption is informed, instructions to return to the start of a processing procedure of the conversion processing means in the main data holding means as the main instructions, to replace the main instructions, initializes an entry corresponding to a storage destination address of the target instruction in the conversion indicating means, and indicates nonconversion.

16. An apparatus according to claim 15, further comprising write counting means for counting the number of occurrences of the write protection interruption, wherein said conversion processing means, when the number of occurrences of the write protection interruption exceeds a preset number of occurrences, recognizes that target instruction is an instruction for a storage, by decoding the target instruction.

17. An apparatus for emulation in which target software dedicated to a target computer is converted into main software to be executed on a main computer, comprising:

program data conversion processing means for sequentially converting a program block from a starting address to an address with which a branch instruction begins, of target program data constituting the target software, into program data constituting the main software, executing said main software to thereby execute a process equivalent to the target software;

main software holding means for holding the main software converted by said program data conversion processing means; and a conversion state registering section for registering identification data showing if the program data to be converted by the program data conversion processing means has been converted into the main program data, for every corresponding address;

said program data conversion processing means including a determination section for, when the program data conversion processing means executes said main software before executing the branch instruction, determining if the main program data corresponding to branch destination program data is held in said main software holding means by referring to said conversion state registering section;

a branch execution section for, when the main program data corresponding to the branch destination program data in the branch instruction is determined to be held in said main software holding means, executing the branch instruction on the basis of the program data held in said software holding means; and a branch destination conversion section for, when the main program data corresponding to the branch destination program in the branch instruction data is determined not to be held in said main software holding means, the target program data into the main program data while serving the branch destination address as the starting address.

18. A method for emulation in which target software running on a target computer system of first architecture is converted into main software to be executed on a main computer of second architecture different from the first architecture, said method comprising:

converting program data of the target software into program data of the main software;

holding program data constituting the main software;

registering if the program data constituting the target software has been converted in said converting step into the program data constituting the main software;

determining if the program data of the target software to be converted has been converted into the program data constituting the main software, by referring to a registered result in said conversion state registering; and when the program data of the target software is determined to have been converted into the program data constituting the main software in said determining, executing, as a first executing operation, the program data constituting the main software held in said holding step, and when the program data of the target software is determined not to have been converted into the program data constituting the main software in said determining, executing, as a second executing operation, the program data constituting the main software after the program data of the target software is converted into the program data of the main software in said converting, said first and second operations being selectively carried out based on the result of said determining.

19. A method for emulation in which target software dedicated to a target computer of first architecture is converted into main software to be executed on a main computer of second architecture different from the first architecture, said method comprising:

sequentially converting a program block from a starting address to an address with which a branch instruction begins, of program data in the target software, into the main software;

holding program data constituting the main software as the result of said converting step;

registering if the program data constituting the target software has been converted into program data constituting the main software, for every corresponding address;

executing the main software as the result of said converting step;

when the main software before executing the branch instruction, determining if branch destination program data has been converted into the program data constituting the main software, by referring to the result of said registering step;

when the branch destination program data is determined to have been converted into the program data constituting the main software in said determining step, executing the branch instruction on the basis of the converted program data held in said holding step; and when the branch destination program data is determined not to have been converted into the program data constituting the main software in said determining step, executing the branch instruction, as regarding the branch destination address as the starting address, after the program data of the target software is converted into the program data of the main software.

20. A computer readable recording medium in which an emulation program for executing target software, dedicated to a target computer of first architecture, on a main computer of second architecture different from the first architecture is recorded, said emulation program being capable of executing the following functions:

a conversion function for converting program data of the target software into program data of the main software;

a main software holding function for holding program data constituting the main software as the result of said conversion function;

a conversion state registering function for registering if the program data of the target software as the result of said conversion function has been converted into the program data constituting the main software;

a determining function for determining if the program data of the target software has been converted into the program data constituting the main software, by referring to the result of said conversion state registering function; and an execution function for, when the program data of the target software is determined to have been converted into the program data constituting the main software as the result of said determining function, executing the program data constituting the main software held by said main software holding function, and when the program data of the target software is determined not to have been converted into the program data constituting the main software as the result of determining function, executing the program data constituting main software, after the program data of the target software is converted into the program data of the main software as the result of said conversion function.

21. A computer readable recording medium in which an emulation program for executing target software, dedicated to a target computer of first architecture, on a main computer of second architecture different from the first architecture is recorded, emulation program being capable of executing the following functions:

a conversion function for sequentially converting a program block from a starting address to an address with which a branch instruction begins, of program data in the target software, into a main software, a main software holding function for holding program data constituting the main software as the result of said conversion function;

a conversion state registering function for registering if the program data constituting the target software has been converted into program data constituting the main software for every corresponding address as the result of said conversion function;

an execution function for executing the main software as the result of said conversion function;

a determining function for, when the main software is executed as the result of said execution function before executing the branch instruction, determining if the branch destination program data has been converted into the program data constituting the main software, by referring to the result of said conversion state registering function;

a branch execution function for when the branch destination program data is determined to have been converted into the program data constituting the host software, as the result of said determining function, the branch instruction on the basis of the program data of the host software held by the host software holding function; and a branch destination conversion execution function for, when the branch destination program data is determined not to have been converted into the program data constituting the main software, as the result of said determining function, executing the branch instruction with regard to the branch destination address as the starting address after the program data of the target software is converted into the program data of the main software as the result of said conversion function.

22. An apparatus for converting target instructions of a target computer to main instructions of a main computer, converted target instructions having corresponding routines for executing the target instructions on the main computer, the apparatus comprising:

a conversion indicating device, initially indicating no target instructions have been converted, and thereafter indicating target instructions which have been converted into main instructions; and a conversion processor converting target instructions into main instructions which have not been indicated by the conversion indicating device to have already been converted, and branching to corresponding routines of target instructions when the conversion indicating device indicates that the target instruction has been converted.

23. An apparatus for converting target instructions of a target computer to main instructions of a main computer, converted target instructions having designated routines for executing the target instructions on the main computer, the apparatus comprising:

a conversion processor converting target instructions into main instructions by creating a designated routine or using an already created designated routine; and a word boundary detector detecting and counting word boundary violations during said converting.

24. An apparatus for converting target instructions of a target computer to main instructions of a main computer, converted target instructions having designated routines for executing the target instructions on the main computer, the apparatus comprising:

a conversion processor converting target instructions into main instructions by creating a designated routine or using an already created designated routine; and a locking device issuing a write protection interruption when an already converted target instruction is attempted by the conversion processor to be converted again.

* * * * *